United States Patent
Jayapal et al.

(10) Patent No.: US 12,438,923 B2
(45) Date of Patent: *Oct. 7, 2025

(54) ESTABLISHING AND MANAGING CONNECTIONS FOR REAL TIME COMMUNICATIONS

(71) Applicant: COMCAST CABLE COMMUNICATIONS, LLC, Philadelphia, PA (US)

(72) Inventors: Rameshkumar Ayyasamy Jayapal, Mount Laurel, NJ (US); Manoj Chaudhari, Dayton, NJ (US); Naresh Mudupu, Mount Laurel, NJ (US); Chris Wendt, Exton, PA (US); Saravanan Muthusamy, Wayne, PA (US); Balachandar Gurusamy, King of Prussia, PA (US); Neppoliyan Thangavelu, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/799,722

(22) Filed: Feb. 24, 2020

(65) Prior Publication Data

US 2020/0336515 A1    Oct. 22, 2020

Related U.S. Application Data

(63) Continuation of application No. 15/138,439, filed on Apr. 26, 2016, now Pat. No. 10,616,285.

(51) Int. Cl.
*H04L 65/1069* (2022.01)
*H04L 65/1104* (2022.01)
(Continued)

(52) U.S. Cl.
CPC ...... *H04L 65/1069* (2013.01); *H04L 65/1104* (2022.05); *H04L 67/02* (2013.01);
(Continued)

(58) Field of Classification Search
CPC ............... H04L 65/1069; H04L 67/146; H04L 67/1031; H04L 67/42; H04L 67/141;
(Continued)

(56) References Cited

U.S. PATENT DOCUMENTS

2004/0121765 A1* 6/2004 Idnani ................. H04L 65/1104
709/227
2005/0207361 A1 9/2005 Rosenberg et al.
(Continued)

OTHER PUBLICATIONS

Wikipedia, "High-availability cluster", Oct. 22, 2015, total 4 pages (Year: 2016).*

(Continued)

*Primary Examiner* — Brian J. Gillis
*Assistant Examiner* — Chhian (Amy) Ling
(74) *Attorney, Agent, or Firm* — BakerHostetler

(57) ABSTRACT

Methods and systems related to supporting real time communications are disclosed. In one type of a real time communication session, prior to an offer and acceptance to perform real time communications, a communication channel may be established between a caller device and a callee device. Information related to addresses of the caller and callee devices can be contained in, or pointed to, by a Universal Resource Locators (URLs) for the caller and callee devices. A network computing device may communicate messages relating to establishing and maintaining the communication channel between the caller and callee devices. In a scenario where the network computing device becomes unavailable, another network computing device
(Continued)

can use the URLs and other channel information that may be stored in the database, to handle messages.

17 Claims, 23 Drawing Sheets

(51) Int. Cl.
*H04L 67/02* (2022.01)
*H04L 67/1031* (2022.01)
*H04L 67/141* (2022.01)
*H04L 67/146* (2022.01)
*H04L 69/40* (2022.01)
*H04M 3/42* (2006.01)
*H04M 7/00* (2006.01)
*H04W 76/10* (2018.01)
*H04W 76/19* (2018.01)

(52) U.S. Cl.
CPC ........ *H04L 67/1031* (2013.01); *H04L 67/141* (2013.01); *H04L 67/146* (2013.01); *H04L 69/40* (2013.01); *H04M 3/42076* (2013.01); *H04M 3/42119* (2013.01); *H04W 76/10* (2018.02); *H04M 7/0075* (2013.01); *H04W 76/19* (2018.02)

(58) Field of Classification Search
CPC ..... H04L 67/02; H04L 69/40; H04L 65/1104; H04L 67/01; H04M 7/0075; H04M 3/42119; H04M 3/42076; H04W 76/10; H04W 76/19
See application file for complete search history.

(56) References Cited

U.S. PATENT DOCUMENTS

| | | | |
|---|---|---|---|
| 2009/0022145 A1* | 1/2009 | Bakshi | H04L 12/66 370/352 |
| 2009/0161843 A1 | 6/2009 | Sylvain | |
| 2009/0238358 A1* | 9/2009 | Ramanathan | H04M 3/42042 379/221.03 |
| 2010/0015980 A1 | 1/2010 | Seta et al. | |
| 2010/0266111 A1 | 10/2010 | Crausaz et al. | |
| 2010/0278099 A1* | 11/2010 | Lee | H04L 65/1006 370/328 |
| 2011/0044319 A1* | 2/2011 | Younis | H04L 65/1046 370/352 |
| 2011/0116492 A1* | 5/2011 | Byron | H04M 3/42221 370/352 |
| 2012/0155445 A1* | 6/2012 | Javaregowda | H04L 65/1083 370/338 |
| 2014/0333713 A1 | 11/2014 | Shoemake et al. | |
| 2015/0236905 A1* | 8/2015 | Bellan | H04L 41/0806 709/222 |
| 2015/0281234 A1 | 10/2015 | Sylvain | |
| 2016/0212074 A1 | 7/2016 | Yu et al. | |
| 2016/0219093 A1 | 7/2016 | Gangadharan et al. | |
| 2016/0308977 A1* | 10/2016 | Ezell | H04L 65/1104 |
| 2017/0111407 A1* | 4/2017 | Kotnis | H04L 65/105 |
| 2017/0289200 A1 | 10/2017 | Mendiratta et al. | |
| 2017/0289201 A1* | 10/2017 | Mendiratta | H04L 69/40 |
| 2017/0325141 A1* | 11/2017 | Laliberte | H04W 80/08 |

OTHER PUBLICATIONS

Rfc3261, "SIP: Session Initiation Protocol", Network Working Group, Jun. 2002. (Year: 2002).*
Rfc4566, "SDP: Session Description Protocol", Network Working Group, Jul. 2006. (Year: 2006).*
"The Session Description Protocol (SDP)", Nick Galea, CEO, 3CX, Oct. 11, 2009. (Year: 2009).*
Acharya et al., "Unleashing the Power of Wearable Devices in a SIP Infrastructure", Proceedings of the 3rd IEEE Int'l Conf. on Pervasive Computing and Communications (PerCom 2005), 10 Pages. (Year: 2005).
RFC 3261, "SIP: Session Initiation Protocol".
Rosenberg, et al., "RFC 3261, SIP: Session Initiation Protocol", Network Working Group, Standards Track, Jun. 2002, 269 Pages. (Year: 2002).

* cited by examiner

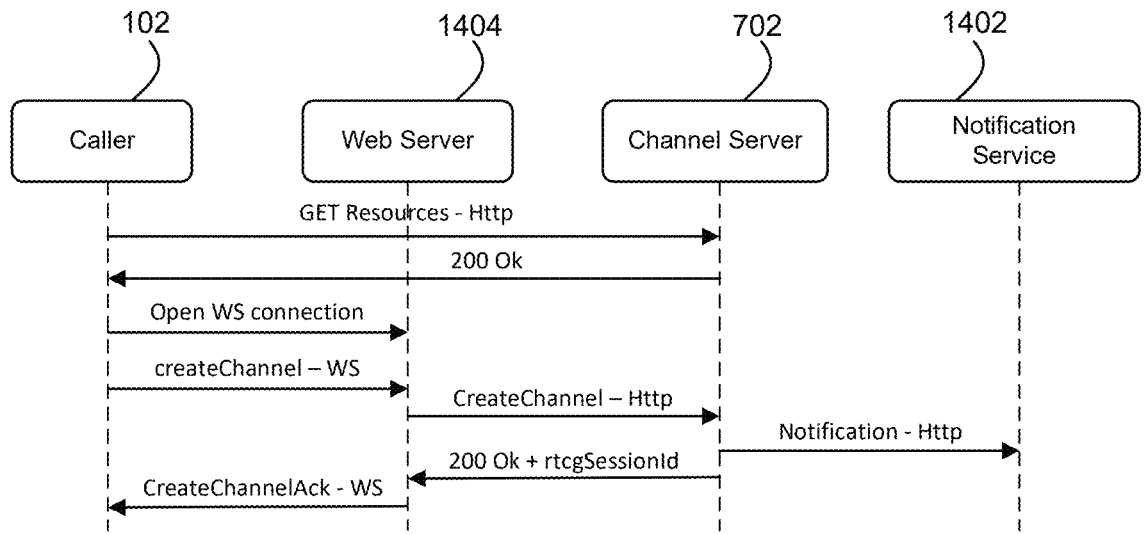

FIG. 14

Request:
Request Body: WS
{
    "type": ""createChannel",
    "to": ""to@comcast.net",
    "from": ""from@comcast.net",
    "fromDisplay": "rtcgateway",
    "clientSessionId": "0@e442090-9c1c-11e3-924d-3df3a45b2acb-962314",
    "messageId": 1,
    "uid": ""uid@comcast.net",
    "appId": "PBA",
    "instanceId": ""be90ff6af1724cc4ec1a236fa152749e3f45ea87"
}Successful Response:
{
    "clientSessionId": "@e442090-9c1ic-11e3-924d-3df3a45b2acb-962314",
    "messageId": 1,
    "hasErrors": false,
    "rtcgSessionID ": "724cc4ec1a236fa",
    "type": ""channelCreatedAck",
    "session": "created",
    "channel": "created",
    ""callbackUrl": "http: //wsxxx.comcast.net/channel/dsfgfsdf"
}

FIG. 15

Request:
Request Body: WS
```
{
    "type": "openChannel",
    "to": "to@comcast.net",
    "from": "from@comcast.net",
    "fromDisplay": "rtcgateway",
    "clientSessionId": "@e442090-9c1c-11e3-924d-3df3a45b2acb-962314",
    "messageId": 2,
    "rtcgSessionId ": "724cc4ec1a236fa",
    "uid": ""uid@comcast.net",
    "appId": "PBA",
    "instanceId": "be9@ff6af1724cc4ec1a236fa152749e3F45ea87",
    "callbackUrl": "http: //wsxxx.comcast.net/channel/asdfg"
}
```

Successful Response:
```
{
    "hasErrors": false,
    "rtcgSessionId ": "724cc4ec1a236fa",
    "session": "active",
    "type": ""channelOpenedAck",
    "clientSessionId": "@e442090-9c1c-11e3-924d-3df3a45b2acb-962314",
    "messageId": 2,
    "callbackUrl": "http: //wsxxx.comcast.net/channel/asdfg",
    "targets":[{
        "callbackUrl": http: //wsxxx.comcast.net/channel/dsfgfsdf
    }]
}
```

Send channel open notification to channel creator:
```
{
    "hasErrors": false,
    "rtcgSessionId": "724cc4ec1a236fa",
    "type": "channelOpenedNotification",
    "clientSessionId": "@e442098-9c1c-11e3-924d-3df3a45b2acb-962314",
    "callbackUrl": "http: //wsxxx.comcast.net/channel/dsfgfsdf"
    "targets":[{
        "callbackUrl": http: //wsxxx.comcast.net/channel/asdfg
    }]
}
```

FIG. 17

Request
Request Body: WS
{
    "type" :"channelMessage",
    "to": "to@comcast.net",
    "from': 'from@comcast.net',
    "rtcgSessionId": "95202f40-f17c-11e3-ac23-9d963aa45dc4",
    "clientSessionId": "82424186-8ef1-4248-819c-1bda102d2041",
    "messageId": 3,
    "payload": {
        "sdp": "v=0\r\no=-234we5.@.0.1\r\ns=-\r\nt=00\r\na=group:
        BUNDLEaudiovideo\r\na=msid-semantic:nm=audioiRTPSAVPF111110513126",
        "type": "offer",
        "target": "bob@comcast.net",
        "to": "bob@comcast.net",
        "from': "alice@comcast.net",
        "applicationContext": "default",
        "clientSessionId": "82424186-8ef1-4248-819c-1bda102d2041",
        "peerConnectionId": "6e1b1477-d4fe-451c-a@bd-d7f5b5eeb55Ff",
        "streamOptions": {
            "screen_share": false,
            "video_resolution": "default",
            "one_way": false
        }
    },
    "uid": "alice@comcast.net",
    "targets":[
      {"callbackUrl": "http://wsxxx.comcast.net/channel/dsfgfsdf"} ]
}

Successful Response:
{
    "hasErrors": false,
    "rtcgSessionId": "95202f40-f17c-11e3-ac23-9d963aa45dc4",
    "type": "channelessageAck",
    "clientSessionId": "82424186-8ef1-4248-819c-1bda102d2041",
    "messageId": 3,
    "callbackUrl": "http: //wsxxx.comcast.net/channel/dsfgfsdf",
}

FIG. 19

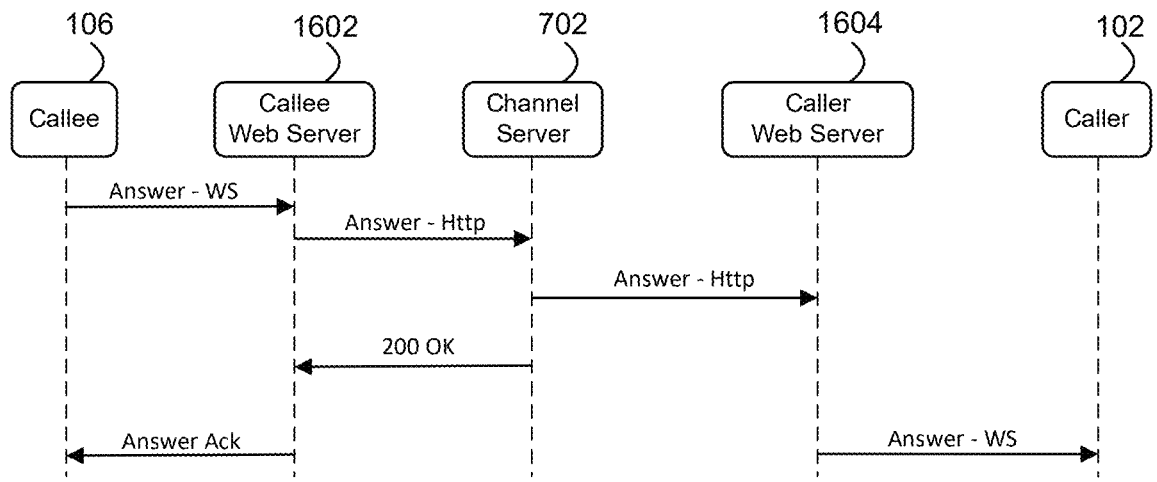

FIG. 20

Request:
Request Body: WS
{
    "type":"channelMessage",
    "to": "to@comcast.net",
    "from': 'from@comcast.net',
    "rtcgSessionId": "95202f40-f17c-11e3-ac23-9d963aa45dc4",
    "clientSessionId": "82424186-8ef1-4248-819c-1bda102d2041",
    "messageId": 4,
    "payload": {
     "sdp": "v=0\r\no=-234we5.@.0.1\r\ns=-\r\nt=00\r\na=group:
     BUNDLEaudiovideo\r\na=msid-semantic :nm=audio1RTP/SAVPF111110513126",
       "type": "answer",
       "target": "bob@comcast.net",
       "to": "bob@comcast.net",
       "from': "alice@comcast.net",
       "applicationContext": "default",
       "clientSessionId": "82424186-8ef1-4248-819c-1bda102d2041",
       "peerConnectionId": "6e1b1477-d4fe-451c-a@bd-d7f5b5eeb55f",
       "streamOptions": {
          "screen_share": false,
          "video resolution": "default",
          "one_way": false
       }
    },
    "uid": "alice@comcast.net",
    "targets": [
     {"callbackUrl": "h ttp: //wsxxx.comcast.n et/channel/dsfgfsdf"} ]
}

FIG. 21

Request:
Request Body: WS
}
    "type": "reconnectToChannel",
    "to": "to@comcast.net",
    "from"': "from@comcast.net",
    "clientSessionId": "f4b56f6c-830d-4c88-8b71-853b6a7c7bce",
    "messageId": 5,
    "rtcgSessionId": "fci2bfa@-f17d-11e3-ac23-9d963aa45dc4",
    "uid": "alice@comcast.net"
}

Successful Response:
{
    "hasErrors": false,
    "rtcgSessionId": "fcl2bfa@-f17d-11e3-ac23-9d963aa45dc4",
    "type": "reconnectToChannelAck",
    "callbackUrl": "http://wsxxx.comcast.net/channel/ghfgfsdg",
    "clientSessionId": "f4b56f6c-830d-4c88-8b71-853b6a7c7bce"',
    "messageId": 5
}

Reconnect notification:
Message Body:
  {
    "type": "reconnectChannelNotification",
    "to": "to@comcast.net",
    "from": "from@comcast.net',
    "clientSessionId": 'f4b56f6c-830d-4c88-8b71-853b6a7c7bcO',
    "rtcgSessionId": 'fci2bfa@-f17d-11e3-ac23-9d963aa45dc4',
    "uid": 'alice@comcast.net',
    "oldTargetCallbackUrl":"http: //wsxxx.comcast.net/channel/dsfgfsdf",
    "newlargetCallbackUrl1":"http: //wsxxx.comcast.net/channel/ghfgfsdg"
}

FIG. 23

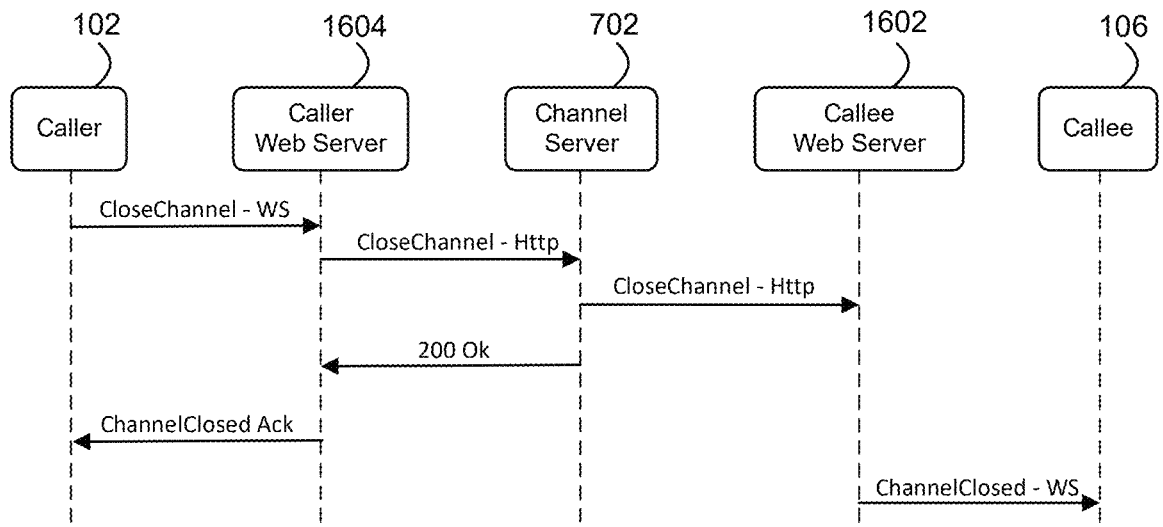

FIG. 24

Request:
Request Body: WS
{
    "type": "closeChannel",
    "to": "to@comcast.net",
    "from': "from@comcast.net",
    "clientSessionId": "82424186-8ef1-4248-819c-1bda102d2041",
    "messageId": 6,
    "rtcgSessionId": "95202f40-f17c-11e3-ac23-9d963aa45dc4",
    "uid": "alice@comcast.net"
}

Successful Response:
{
    "hasErrors": false,
    "rtcgSessionId": "95202f40-f17c-11e3-ac23-9d963aa45dc4",
    "type": "channelClosedAck"
    "clientSessionId": "@e442090-9c1c-11e3-924d-3df3a45b2acb-962314",
    "messageId": 6,
}

Channel closed notification:
{
    "type": "channelClosed",
    "to": "to@comcast.net",
    "from": "from@comcast.net",
    "clientSessionId": "82424186-8ef1-4248-819c-1bda102d2041",
    "rtcgSessionId": "95202f40-f17c-11e3-ac23-9d963aa45dc4",
    "uid": "alice@comcast.net"
}

ESTABLISHING AND MANAGING CONNECTIONS FOR REAL TIME COMMUNICATIONS

CROSS REFERENCE TO RELATED APPLICATIONS

This application is a continuation of U.S. patent application Ser. No. 15/138,439, filed Apr. 26, 2016, now U.S. Pat. No. 10,616,285, which is hereby incorporated by reference in its entirety.

BACKGROUND

Real-time communications (RTC) are communications in which users exchange information instantly or with relatively low latency. RTC communications are well suited for applications that benefit from low latency such as, for example, voice calling, video chat, instant messaging and peer-to-peer (P2P) file sharing.

One example of RTC communications is the Web Real-Time Communication (WebRTC) protocol drafted by the World Wide Web Consortium (W3C) which provides browsers and mobile applications with Real-Time Communications (RTC) capabilities via Application Programming Interfaces (APIs). The WebRTC components have been optimized to support browser-to-browser applications for voice calling, video chat, and related communications.

RTC communications rely on device and network capabilities to establish, maintain and, if necessary, re-establish communication connections between users. This disclosure identifies and addresses shortcomings for establishing, maintaining and re-establishing communication connections, and other features, in RTC environments.

SUMMARY

One aspect disclosed herein relates to embodiments that expand real time communication protocols, such as the WebRTC protocol, to add functionality allowing applications to function with disparate devices across different networks.

According to another aspect, communication channels are established between end points, e.g., a caller device and a callee device. A channel can be considered to be a particular communication session between the caller and callee.

Information relating to channels that are established is stored for later reference. For example, information such as a name associated with a channel, Universal Resource Locators (URLs) associated with the caller and callee devices, and a channel identifier associated with a channel may be stored in a memory, such as a database, in any network or user device. In an example embodiment, a computing device such as a channel server is programmed to coordinate messages between the caller and callee device. In a scenario where a channel server becomes inoperative or otherwise unable to perform its functions, for example, if a one of the user devices loses a connection with a network node and then regains a connection on another network node, another channel server can use the channel information stored in the database to handle the messages.

In an example embodiment involving a telephone type communication, a create channel request is generated at a caller device to set up a channel for a connection between the caller device and a callee device. The create channel request can be sent to a mediator system that notifies the callee device of the created channel. The callee device can respond to the mediator system by communicating an open channel indication. Messages communicated between the caller device and callee device can include information, such as information in or indicated by a URL, designating the devices. For example, a caller URL indicating the address of the caller can be sent from the caller to the callee. Similarly, a callee URL indicating the address of the callee can be sent from the callee to the caller.

Another aspect relates to a scenario where the callee device or caller device disconnects or changes its URL, e.g., when a user device loses connection with one network node and regains a connection at the same or different node. Reconnect messages can allow the devices to reconnect to a channel. The reconnect message can identifying a new caller or callee URL for the channel. The channel information that is stored for the particular channel can updated with the new URL and this new URL can be forwarded to the other party.

In another aspect, messages for establishing and maintaining communication channels are used in connection with a real time communication protocols. In an example scenario, in order for a mobile device to connect to and communicate with another user device, such as a gateway, video processor/display, a set top device (STB), etc., the mobile device makes a call to an RTC Platform and requests that a channel be created. The RTC Platform performs validations (for example, whether the receiver blocked the sender), creates a channel, and sends notification including channel information to the user device. The user device receives the notification and connects to the channel using a communication such as an openChannel message. Once both devices are in the channel, a normal offer/accept can take place, and communication between the devices can begin. Additional advantages will be set forth in part in the description which follows or may be learned by practice. It is to be understood that both the foregoing general description and the following detailed description are exemplary and explanatory only and are not restrictive.

BRIEF DESCRIPTION OF THE DRAWINGS

The accompanying drawings, which are incorporated in and constitute a part of this specification, illustrate embodiments and together with the description, serve to explain the principles of the methods and systems.

FIG. 14 is a flow diagram depicting example processing for creating a channel by the caller device.

FIG. 15 depicts example message formats for use in the example processing of FIG. 14.

FIG. 17 depicts example message formats for use in the example processing of FIG. 16.

FIG. 19 depicts example message formats for use in the example processing of FIG. 18.

FIG. 20 is a flow diagram depicting example processing for answer signaling.

FIG. 21 depicts example message formats for use in the example processing of FIG. 20.

FIG. 23 depicts example message formats for use in the example processing of FIG. 22.

FIG. 24 is a flow diagram depicting example processing for close channel messaging.

FIG. 25 depicts example message formats for use in the example processing of FIG. 24.

DETAILED DESCRIPTION OF ILLUSTRATIVE EMBODIMENTS

The WebRTC protocol provides a framework for communicating between two points but is lacking in several respects. For example, the WebRTC protocol does not specify how to perform call signaling. The WebRTC framework assumes that parties who want to communicate know when to start a session. Also, WebRTC does not define how to identify the parties with whom to communicate. Rather, the WebRTC protocol assumes that interested parties know the WebRTC unique URL link associated with a specific session.

The WebRTC protocol also lacks an inherent reconnect mechanism. In some instances, a client loses connectivity to their current session as a consequence of a network failure and/or due to having to switch between networks. Using the WebRTC protocol, the only way to reconnect the callee device/caller device is to request a new session between the parties. While the operating assumptions implicit in the WebRTC protocol may be acceptable for many application environments, for many other real world applications, the limitations in the protocol present real issues. This is especially true in connection with applications that attempt to connect disparate devices like mobile devices and customer premises equipment (CPE) such as set-top boxes.

Applicant has noted potential work-arounds to the limitations in existing protocols. For example, in some instances it may be possible to use simple messaging service (SMS), email with a custom-format message, or communications over phone to communicate a WebRTC link to another party requesting that a party join the WebRTC session. However, such techniques may not be effective in many scenarios such as, for example, where the other party may be busy on a phone call, not close to a phone or PC, or busy watching television programming and, therefore, unaware of a call. It is possible that a party might join a communication, wait for others to join, and eventually give up waiting, not knowing how much time it takes for another party to join the session.

Figure 1:
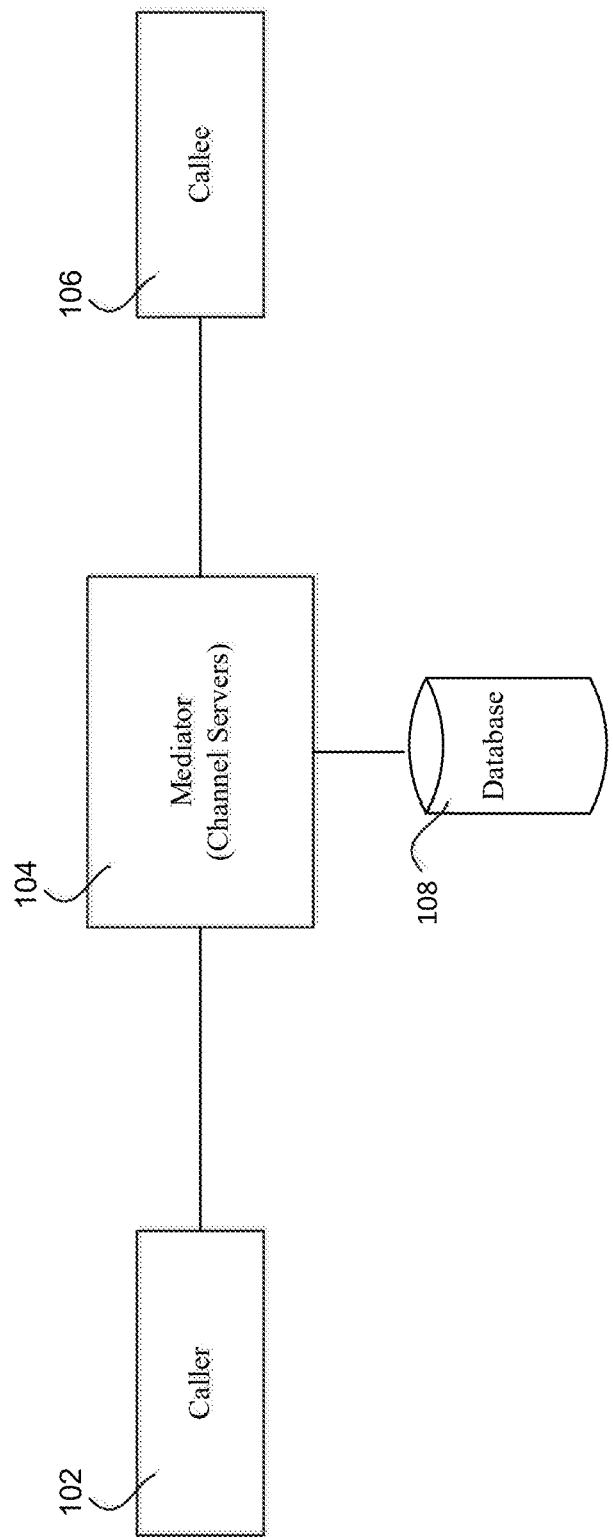
FIG. 1 is a block diagram depicting an example communication system.

Applicant discloses herein systems and methods that address limitations in real time protocols such as WebRTC by establishing a communication channel between devices prior to offer and acceptance of real time communications. FIG. 1 shows an exemplary system. Caller device 102 interacts with a mediator system 104 to forward messages to caller device 106. Channel Information relating to channels created by devices including between devices 104 and 106 is stored in database 108. In an example embodiment, the mediator system 104 includes multiple channel servers.

In order for the caller device 102 to communicate a message to the callee device 106, the caller device 102 needs to have the address of callee device 106 and vice versa. In an example embodiment, the devices 102 and 106 rely upon the mediator system 104 to create a channel between the devices. In an example embodiment, the mediator system 104 may comprise one or more channel servers that operate to facilitate the creation of communication channels between devices as described below.

Typically a large amount of messaging takes place in real time communication systems. If the database 108 were accessed for every message, a performance bottleneck may occur. Numerous database lookups can impact scalability.

In example embodiment of the disclosed systems, messages sent by devices 102 and 106 include a URL corresponding to the device to which the communication is intended, i.e. the "other party" to a communication. For example, a communication from device 102 directed to device 106 contains a URL identifying device 106 as the intended recipient. The mediator system 104 is programmed to read the URL from messages without requiring an access to the database 108. In one embodiment, a caller URL indicating the address of the caller can be sent from the caller to the callee; and a callee URL indicating the address of the callee can be sent from the callee to the caller.

Mobile clients can frequently change URLs. In an example embodiment of the disclosed systems, a reconnect message is employed to address a change in a device's URL. In the scenario where a caller device 102 or callee device 104 changes a URL, the device sends a reconnect message with the new URL to the mediator system 104. The mediator system 104 forwards the new URL to the other party to any ongoing communication and stores the new URL in the database 108. In one embodiment, once a reconnect to channel message is received, the mediator system 104 sends an acknowledgement to the requesting party and sends a reconnect notification message to the other party.

Figure 2:
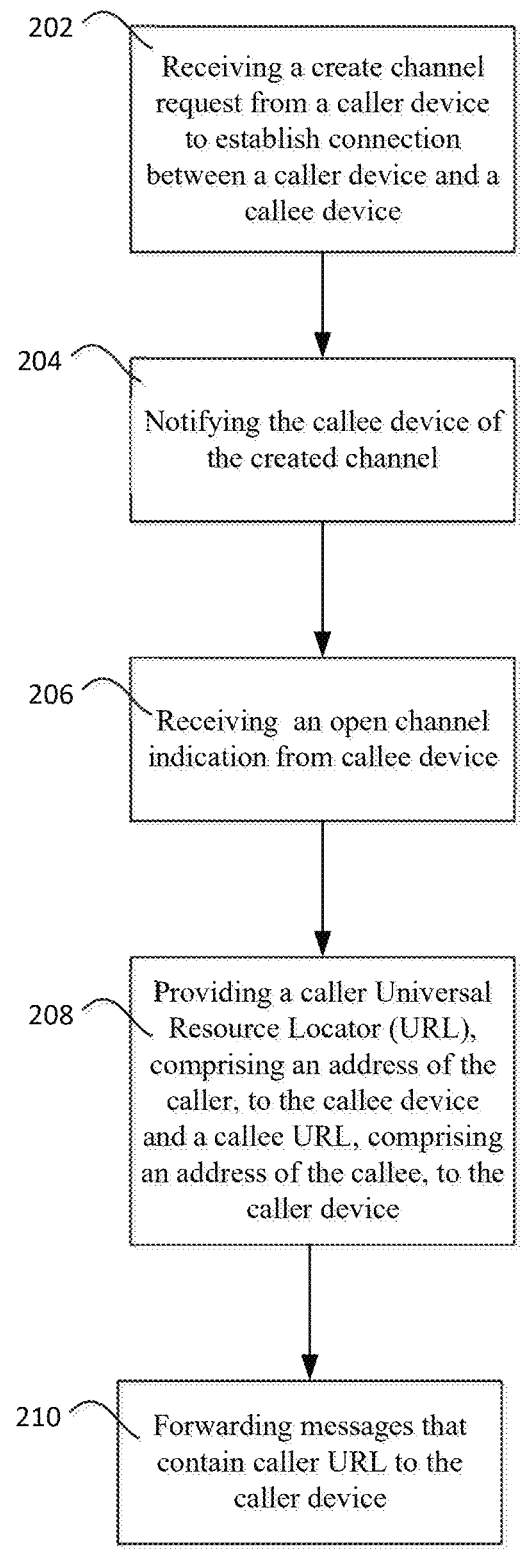
FIG. 2 is a flow diagram depicting example processing for establishing real time communication.

In an example embodiment, the disclosed systems provide stateless storage for a real time communication as well as recovery using persistent storage. Call information is stored in database 108. Accordingly, because channel information need not be stored in the local memory at the mediator system 104, a crash of the mediator system 104 will not bring down the communication channel. FIG. 2 depicts a flow diagram of example high-level processing for establishing a channel for real time communication.

At step 202, a create channel request is received at one or more computing devices, such as mediator system 104, from caller device 102 requesting a connection between the caller device 102 and the callee device 106. The create channel request initiates preparation of a channel for communication.

At step 204, the mediator system 104 communicates notification of the created channel to the callee device 106.

At step 206, the mediator system 104 receives an open channel indication from callee device 106 indicating that the callee device is available for the communication channel.

At step 208, the mediator system 104 communicates a Universal Resource Locator (URL) corresponding to the caller device 102 to the callee device 106 and communicates a URL corresponding to the callee device 106 to the caller device 102. The exchange results in the devices having the URL of the other party. The caller URL can comprise an address of the caller device 102 and the callee URL can comprise an address of the callee device 106.

At step 210, messages that contain the URL corresponding to the caller device 102 are forwarded by mediator system 104 to the caller device 102. Similarly, messages containing the URL of the callee device 106 are forwarded to callee device 106.

In the scenario where the URL for a party changes, a reconnect message including the new URL is communicated to the mediator system 104. Reconnect messages from the caller can be forwarded to the callee and reconnect messages from the callee can be forwarded to the caller.

Figure 3:
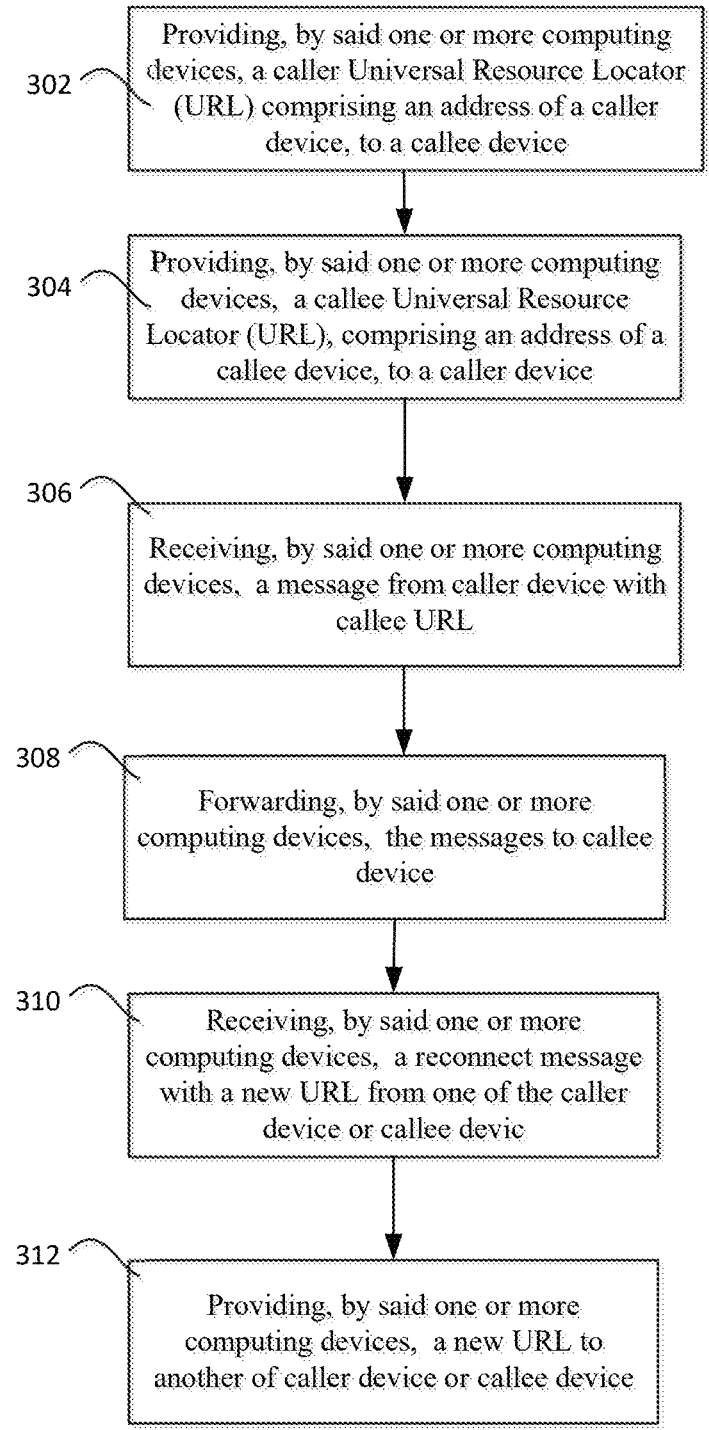
FIG. 3 is a flow diagram depicting example processing for establishing real time communication.

FIG. 3 is a flow diagram of example processing relating to a changed device URL. In an example embodiment, the processing is performed by mediator system 104.

At step 302, in connection with establishing a channel between caller device 102 and callee device 106, one or more devices (such as mediator system 104) communicates a caller URL for caller device 102 to callee device 104. A caller URL can comprise an address of the caller device 102.

At step 304, a callee URL corresponding to callee device 106 is communicated to caller device 102. A callee URL can comprise an address of the callee device 106.

At step 306, a message with the callee URL is received at mediator system 104 from caller device 102. The caller device 102 can insert the URL of the callee device 106 into messages so that the mediator system 104 is able to forward messages to the callee device 106.

At step 308, messages addressed with the URL of the callee device 106 are forwarded to the callee device 106.

In the scenario where the caller device 102 or callee device 106 gets a new URL, a reconnect message may be sent to mediator system 104. At step 310, the reconnect message with a new URL is received at the mediator system 104 from one of the caller device 102 or callee device 106.

At step 312, the mediator system 104 provides the new URL to the other of the of caller device 102 or callee device 106.

Figure 4:
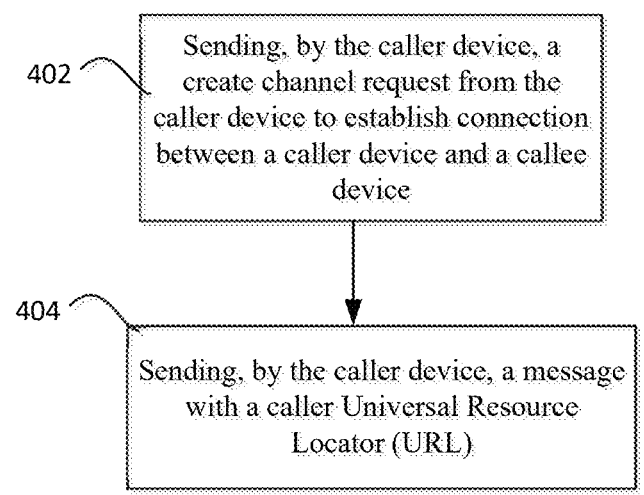
FIG. 4 is a flow diagram depicting example processing for establishing real time communication.

FIG. 4 is a flow diagram depicting example processing relating to reconnecting upon a change in URL.

At step 402, sending, by the caller device 102, a create channel request from the caller device 102 to establish connection between a caller device 102 and a callee device 104.

At step 404, sending, by the caller device 102, a message with a caller Universal Resource Locator (URL). The caller UR can be an address of the caller device 102. The message can be an offer or an answer or some other type of message, for example.

Upon the URL of the caller device 102 changing, sending, by the caller device 102, a reconnect message with a new caller URL.

Figure 5:
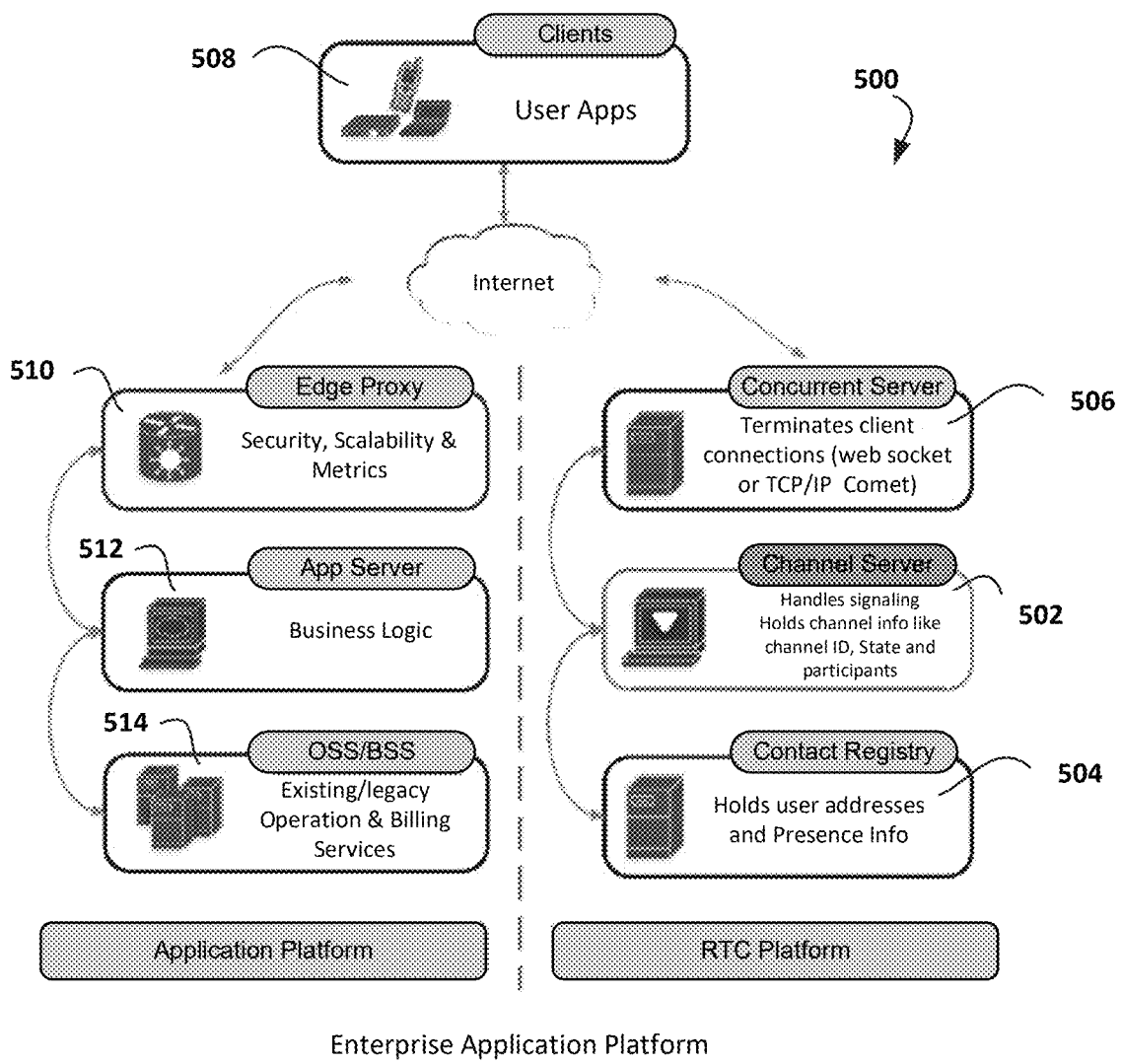
FIG. 5 is a diagram of an enterprise platform.

FIG. 5 depicts an enterprise platform 500 suitable for implementing the processing described herein. As shown in FIG. 5, the components of enterprise platform 500 may be viewed as belonging either to an RTC Platform or an Application Platform. The RTC platform components address functionality relating to providing real time communication. The Application Platform components address application level functionality.

As shown in FIG. 5, the RTC platform comprises channel server 502. Channel server 502 is programmed to handle signaling for communications between caller and callee devices. The channel server 502 is adapted to store channel info such as, for example, a channel ID, state information, and participant information.

The RTC platform further comprises a contact registry 504 that is adapted to store information such as user addresses and presence information.

The RTC Platform further includes a concurrent server 506 which is adapted to connect client devices 508. In an example embodiment, concurrent server 506 terminates client communications using any suitable technologies including, for example, websockets, TCP/IP, comet programming, etc.

In an example embodiment, the Application Platform of enterprise platform 500 comprises edge proxy 510 which is programmed to control application security, scalability and metrics. App server 512 is programmed to execute business logic for an application. Operations Support System (OSS)/Business Support Systems (BSS) 514 are programmed to provide existing and legacy operations as well as billing services.

Figure 6:
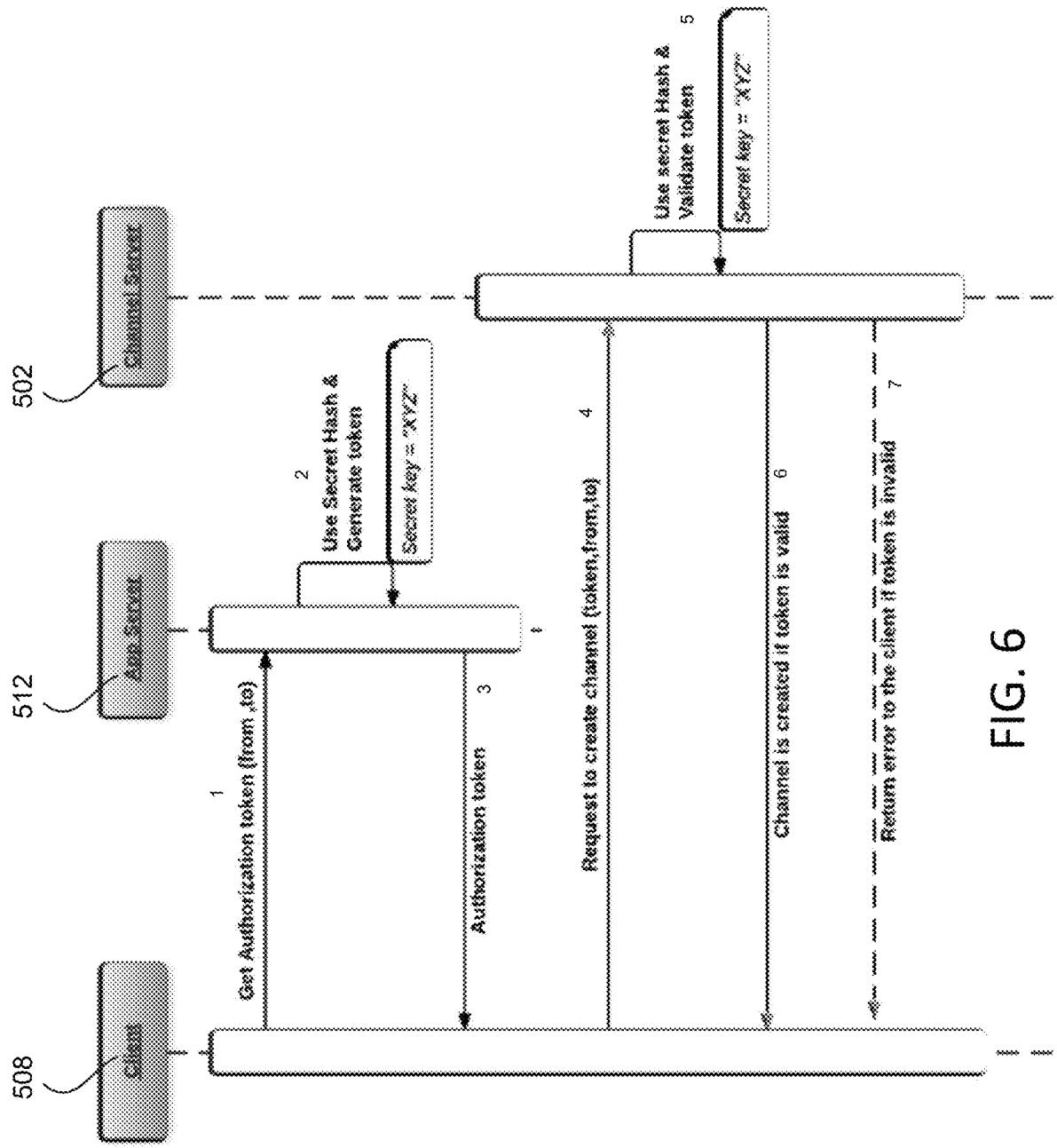
FIG. 6 is a message flow diagram depicting example flows between a client, application server and channel server.

FIG. 6 depicts example message flows between a client device 508, app server 512, and channel server 502. More particularly, FIG. 6 depicts processing whereby an authorization token is obtained by client 508 from app server 512. The token is provided to channel server 502 in order to create a channel. The use of a token prevents unauthorized users from accessing the system. Other security systems can be used as well.

Referring to FIG. 6, at step 1, an authorization request is generated by client 508 and sent from client 508 to app server 512. At step 2, the app server 512 generates a token using a secret hash. At step 3, the authorization token is sent to client 508.

The client device 508 is able to communicate with channel server 502 using the received authorization token. Accordingly, at step 4, the client 508 generates and transmits a request (including the token) to create a channel to channel server 502. At step 5, the channel server 502 uses the secret hash to validate the token. At step 6, assuming the token has been validated, channel server 502 creates a channel and communicates information regarding the created channel to the client device 508. In the instance the token is not validated, at step 7, channel server 502 communicates an error to client device 508.

Figure 7:
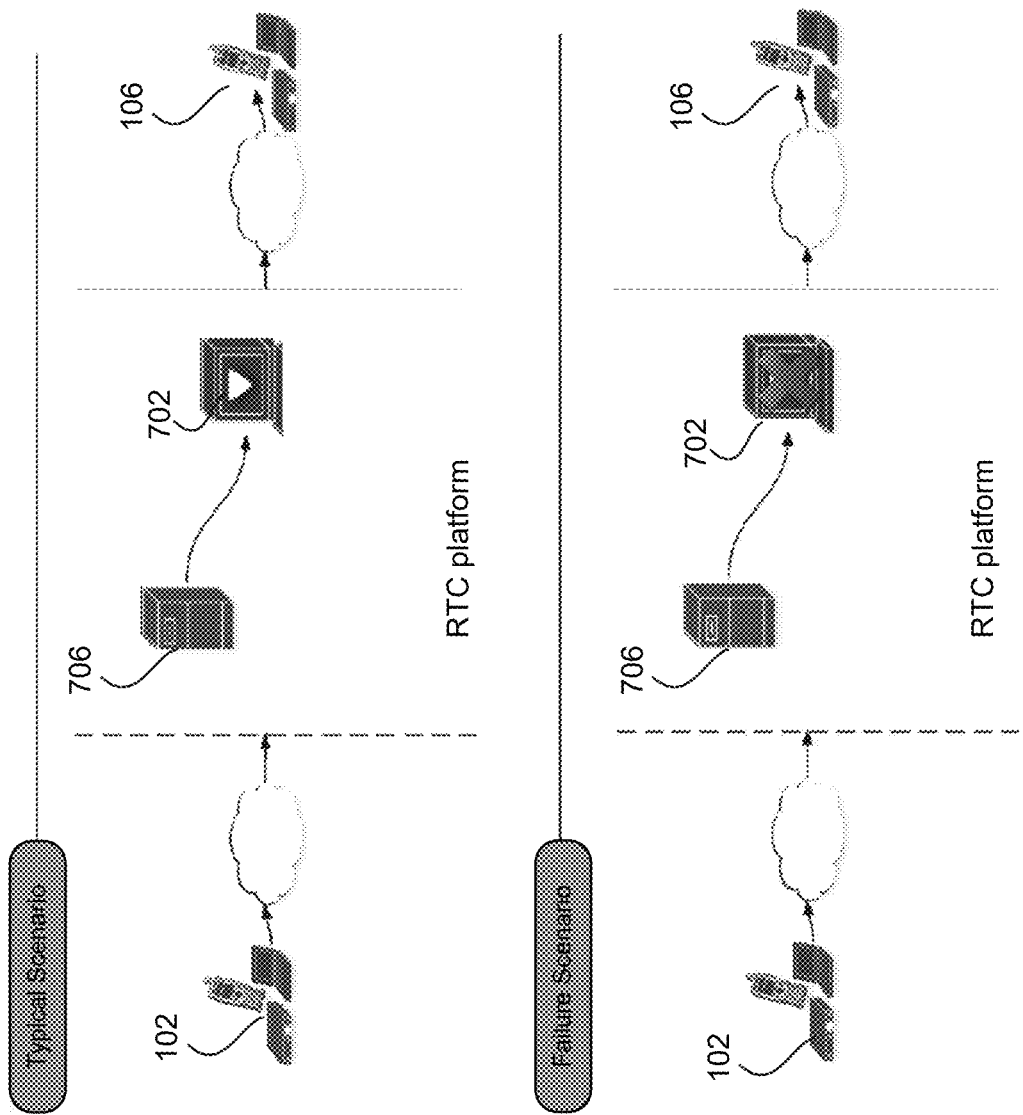
FIG. 7 is a diagram illustrating operation of an example RTC platform operating without a database.
Figure 8:
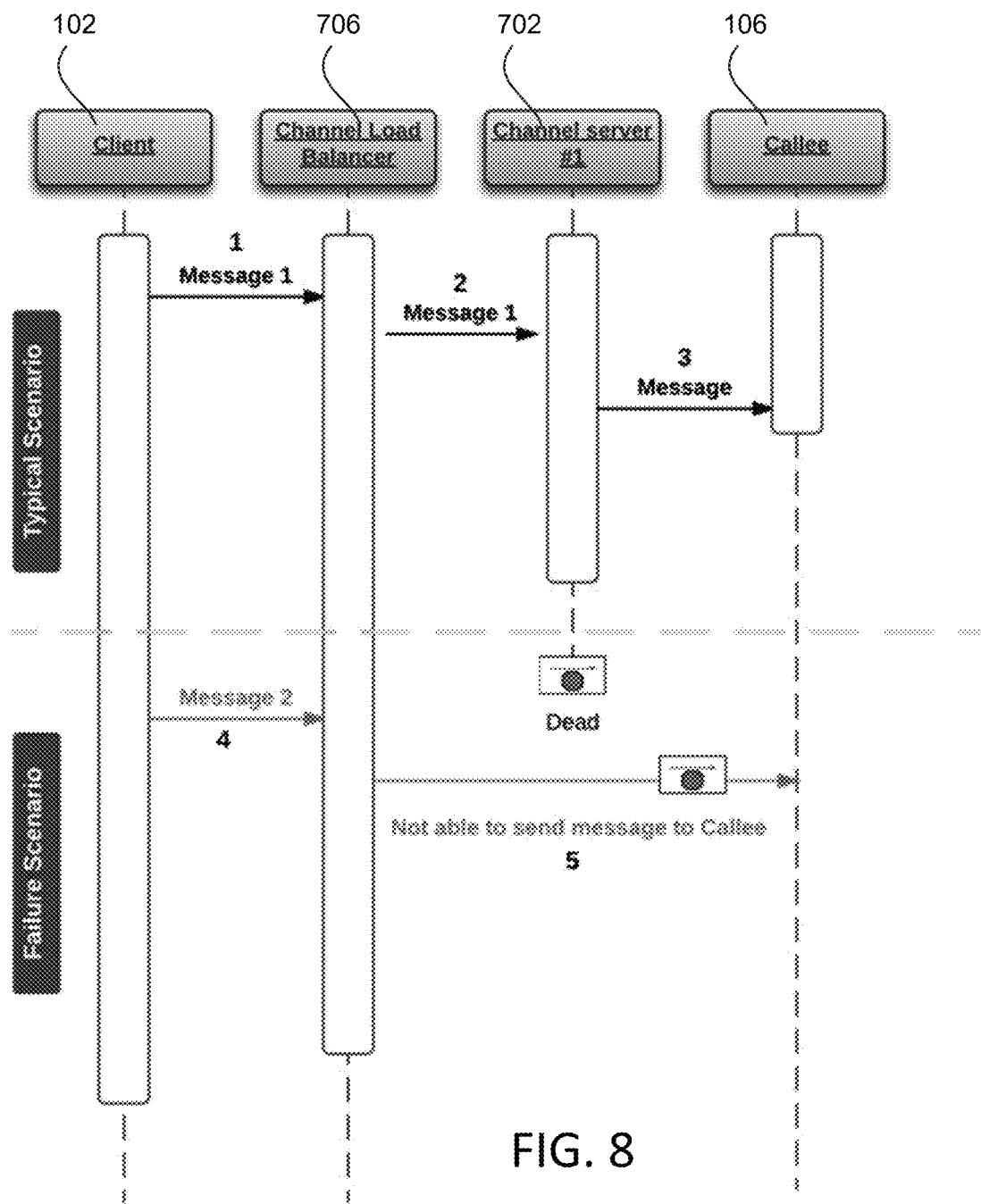
FIG. 8 is message flow diagram depicting example flows between a client, channel servers and a callee device.

FIGS. 7 and 8 illustrate processing in an embodiment of the RTC Platform that lacks a persistent storage such as a database 108. Referring to FIG. 7, in an example scenario labeled "typical scenario," a message from caller device 102 directed to callee device 106 is received by a load balancer 706. Load balancer 706 is programmed to distribute messages among multiple channel servers in order to reduce the load on each channel server. In the example of FIG. 7, the message is sent to channel server 702 which is responsible for creating the channel and handling messages for the channel. The channel information is stored locally at the channel server 702. The "typical scenario" of FIG. 7 is in contrast to the "failure scenario" also depicted in FIG. 7 where channel server 702 fails or becomes otherwise unavailable. In the failure scenario, communication between caller device 102 and callee device 106 is disrupted.

FIG. 8 illustrates message flows between devices in scenarios such as those depicted in FIG. 7. Referring to FIG. 8, and particularly to the portion labeled "Typical Scenario," client device 102 generates and transmits message 1 to callee device 106 through channel server 702. As depicted in the portion of FIG. 8 labeled "Failure Scenario," when channel server 702 fails or otherwise becomes unavailable, the channel is disrupted. After the failure of server 702, when message 2 is sent, the message will be dropped at load balancer 706 as the serving channel server 702 is not available.

Steps 1-3 of FIG. 8 correspond to the "Typical Scenario" where the channel server is operable. At step 1, client device 102 generates and transmits message 1 to channel load balancer 706. At step 2, the channel load balancer 706 forwards the message 1 to channel server 702. Channel server 702 stores the channel information for the channel locally. At step 3, the message 1 is sent to the callee device 106 since the channel server 702 has the channel information including the callee URL in order to locate callee device 106.

Steps 4-5 of FIG. 8 correspond to the "Failure Scenario" in which the channel server 702 having the channel information in its local memory has failed. At step 4, a message 2 is sent from client 102 to the channel load balancer 706. At step 5, the channel load balancer 706 is unable to forward the message to a channel server since channel server 702 has failed and no other channel server contains the channel information which is needed to identify callee device 106. Accordingly, the message 2 is not forwarded to the callee device 106.

Figure 9:
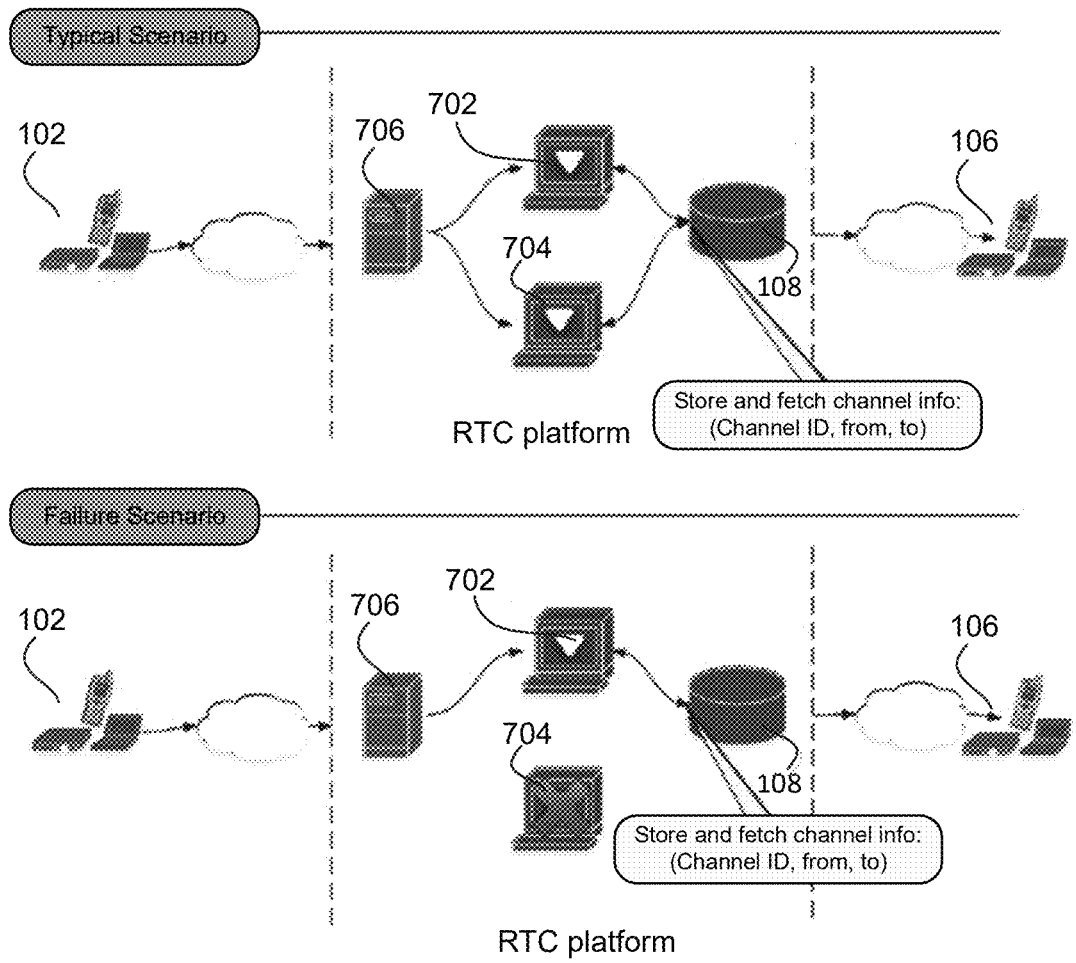
FIG. 9 is a diagram illustrating operation of an example RTC platform with multiple platform servers and a persistent storage.
Figure 10:
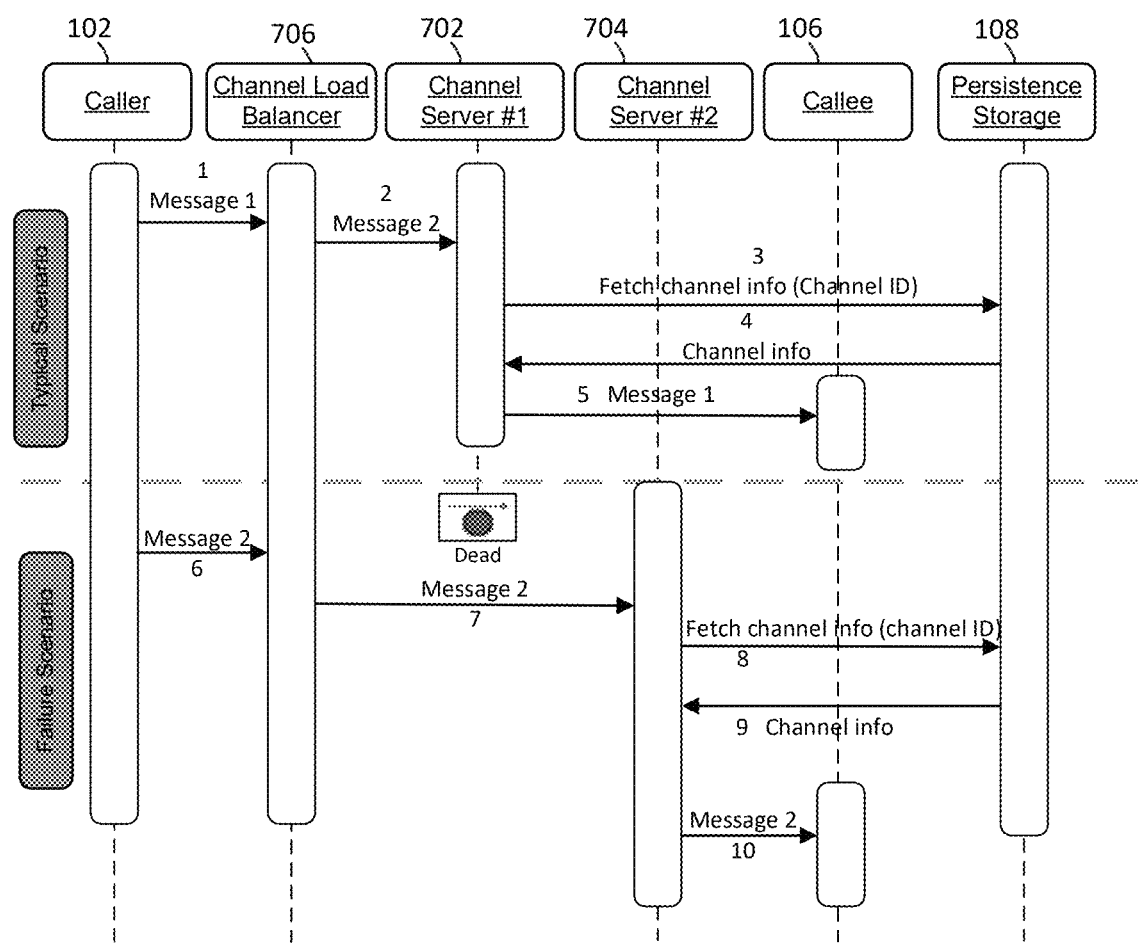
FIG. 10 is a message flow diagram depicting example flows between a client, channel load balancer, channel servers, and a callee device.

FIGS. 9 and 10 illustrate processing in an embodiment of the RTC Platform having persistent storage. FIG. 9 shows the operation of an RTC platform with multiple platform servers 702 and 704 and a persistent storage, such as database 108. The use of a database 108 allows for different channel servers to access the channel information for a channel. In such an embodiment, failure of a particular channel server does not prevent the message from getting to the destination.

Referring to FIG. 9, both a "Typical Scenario" and a "Failure Scenario" are illustrated. Two channel servers 702 and 704 are available for use. Channel load balancer 706 directs messages to channel either server 702 or 704. The messages include channel ID information that identifies a communication channel that the message is associated. The embodiment of FIG. 9 further comprises database 108 which stores information relating to channels that have been created. In an example embodiment, the database 108 contains a channel ID and other channel information such as caller and callee URLs for each channel. Since the channel is not tied to a specific local memory at a specific channel server 702 or 704, different channel servers can handle messages for a specific channel for load balancing or failure reasons. For example, if channel server 704 goes down, channel server 702 can handle the messages for a channel.

FIG. 10 depicts example message flows in an embodiment such as depicted in FIG. 9 that has a persistent storage for channel information. Message 1 is received by channel server 702. Message 1 can include the channel ID. The channel ID obtained from the message can be used by channel server 702 to lookup the callee URL from the database 108. The message is then forwarded to callee device 106. When channel server 702 crashes and message 2 is sent to channel server 704, the channel info for message 2 can be obtained from database 108.

Steps 1-5 of FIG. 10 correspond to a "Typical Scenario". At step 1, the client 102 generates and transmits the message 1 to channel load balancer 706. At step 2, channel load balancer 706 forwards the message 1 to channel server 702. At step 3, the channel server 702 requests channel information corresponding to the message from the database 108. At step 4, the channel information is provided by the database 108 to the channel server 702. At step 5, the channel server 702 uses the channel information provided from database 108 to send the message 2 to the callee device 106.

Steps 6-10 illustrate processing in the event of a "Failure Scenario". In the scenario demonstrated in FIG. 10, the channel server 702 has failed. At step 6, a message 2 is sent from client 102 to the channel load balancer 706. At step 7, the load balancer 706 forwards the message 2 to the channel server 704 rather than the unavailable channel server 702. At step 8, the channel server 704 requests channel information corresponding to the message from the database 108. At step 9, the channel information is provided by the database 108 to the channel server 704. At step 10, the channel server 704 uses the channel information provided from database 108 to send the message 2 to the callee device 106.

Figure 11:
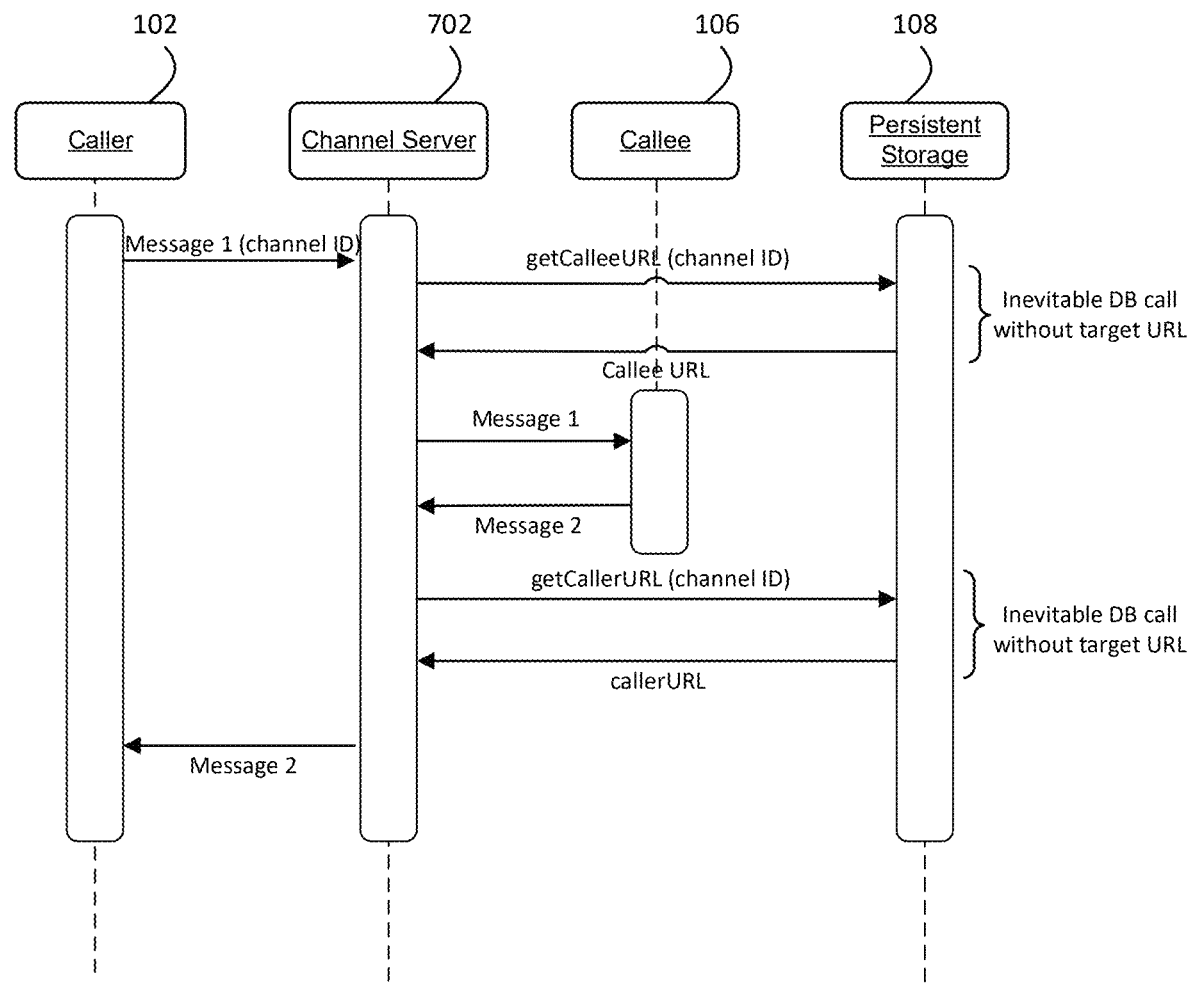
FIG. 11 is a message flow diagram depicting example flows between a caller device, a channel server, a callee device, and a persistent storage.

Storing the channel information in the database 108 allows for continued operation in the event that a channel server crashes. However, if database accesses are made frequently, performance of the system may be degraded. FIG. 11 illustrates an embodiment wherein the channel server 702 access persistent storage 108 for routing of each message. As shown, in connection with processing message 1 which contains a channel ID the channel server 702 queries database 108 for the URL corresponding to the callee device. Channel server 702 then communicates the message to the callee device 106. Similarly, in connection with processing message 2 from callee device 106, channel server 702 queries database 108 for the URL corresponding to a particular channel ID. Only after channel server 702 receives the URL for the caller device 102 can the message be communicated. In this example, each message results in a database hit. This can slow performance and may result in the database 108 becoming overloaded.

Figure 12:
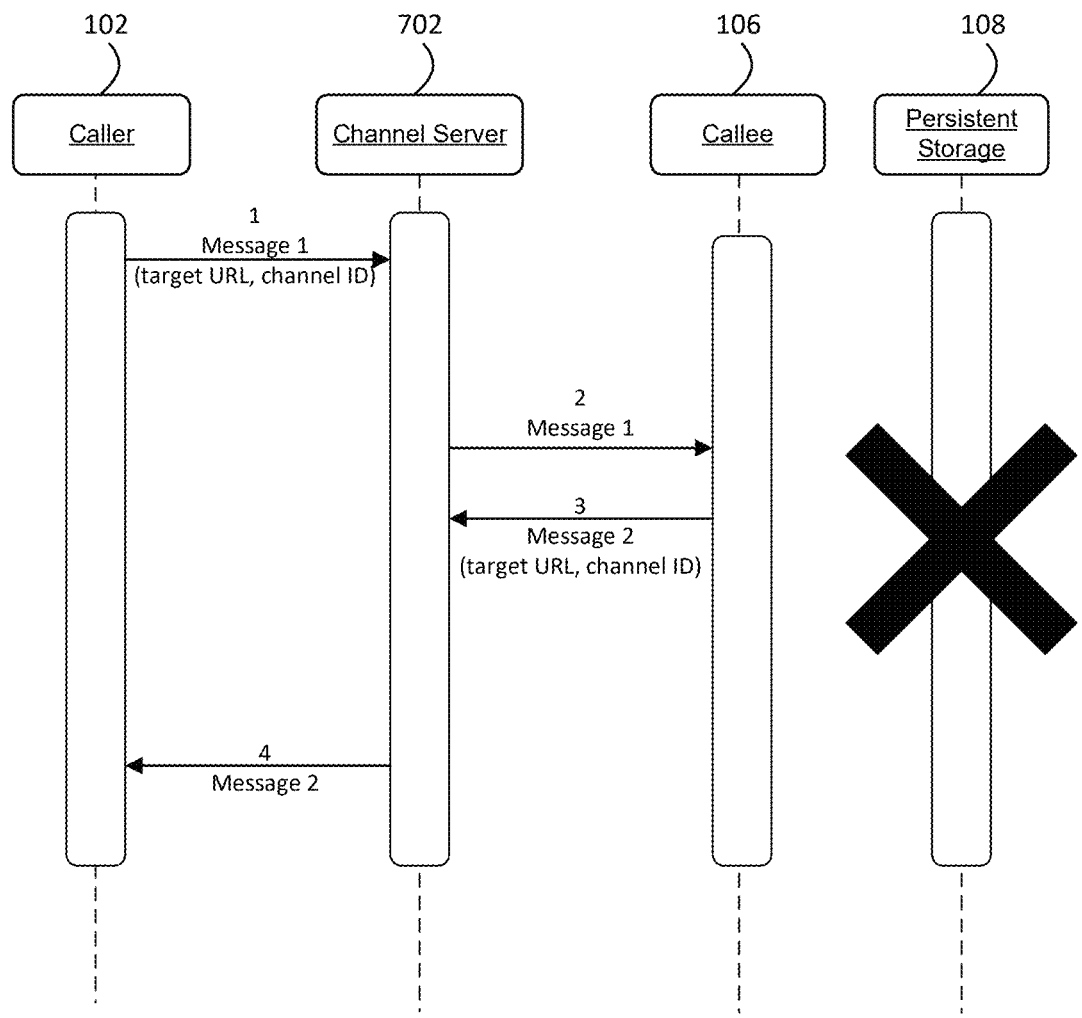
FIG. 12 is a message flow diagram depicting example flows containing a target URL.

FIG. 12 illustrates processing flows in an embodiment wherein the messages contain information, such as a URL, that identify the device to which the message is directed. As is shown in FIG. 12, including a target URL in the messages avoids the need for the channel server 702 to access database 108 for every message. However, the processing requires the caller 102 and callee 106 to store and provide the target URLs for the messages. This processing methodology avoids the need to access database 108, but can require additional processing when a target (caller 102 or callee 106) changes URLs.

Referring to FIG. 12, at step 1, message 1 is communicated from caller device 102 to channel server 702. The message 1 contains the target URL for the callee device 106. At step 2, the channel server 702 uses the target URL in the message 1 to forward the message 1 to the callee device 106.

At step 3, message 2 is communicated from callee device 106 to channel server 702. The message 2 contains the target URL for the caller 102. At step 4, the channel server 702 uses the target URL in the message 2 to forward the message 2 to the caller 102.

While the processing described in connection with FIG. 12 wherein the messages include a target URL avoids the need for the channel server 702 to access database 108 for every message, the processing requires that the caller 102 and callee 106 store and provide the target URLs.

Figure 13:
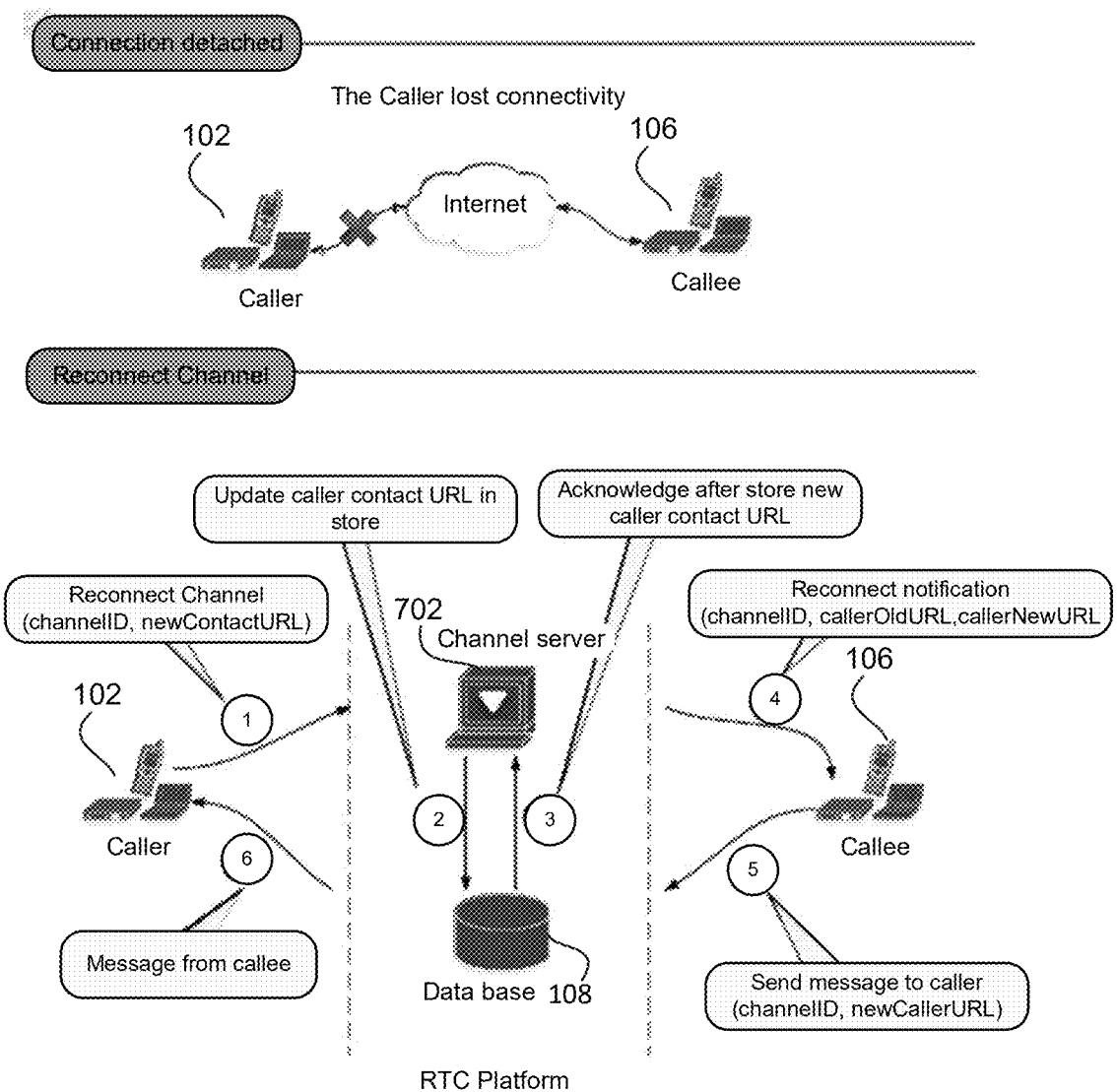
FIG. 13 is a diagram illustrating operation of example reconnect channel messages used to update the system in the instance a party is changing URLs.

FIG. 13 shows the operation of reconnect channel messages that can be used to update the system if a party is about to change URLs. At step 1, a reconnect channel message with the new URL is sent by caller device 102 to channel server 702. At step 2, the new URL is sent to database 108 and an acknowledgement is received at step 3. At step 4, a reconnect notification is sent to callee device 106 with the new caller URL. At step 5, the callee device 106 sends a message with the new URL. The message is processed at channel server 702 and at step 6, the message is communicated to the caller device 102. The reconnect channel messages allows for the system to reconnect with the party when a change in the URL has occurred.

FIGS. 14-26 illustrate exemplary processing for using channels in connection with real time communication.

FIG. 14 illustrates processing for creating a channel. As shown, caller device 102 generates and transmits a "Get resources" message to the channel server 702. The "Get resources" message initiates an entitlement check. Channel server 702 responds with a short lived token which is received at caller device 102.

In response to receiving the token, caller device 102 generates and transmits an open web server connection message containing the token to the web server 1404. The caller device 102 also generates and transmits a create channel message to web server 1404. Web server 1404 forwards the create channel message to channel server 702. In response to the create channel message, channel server 702 communicates a notification message to notification service 1402.

Notification service 1402 receives the notification from channel server 702 and forwards it to the callee device (not shown). In an example embodiment, notification server 1402 accepts subscriptions and, in response, queries a database to determine the type of notification that should be sent to particular device. Because the notification service 1402 is programmed to determine the appropriate notification to send to a particular device, the channel server 702 need not know the type of callee device. For example, the notification server 1402 is programmed to communicate different message types to the various different devices that might receive a communication including, for example, an IPhone, an android phone, a set top box, etc.

The channel server 702 communicates a responsive message to web server 1404, which sends an acknowledgement of the create channel request to caller device 102.

FIG. 15 illustrates example message formats for the message processing illustrated in FIG. 14. More particularly, FIG. 15 depicts example formats for channel requests and a successful response.

Figure 16:
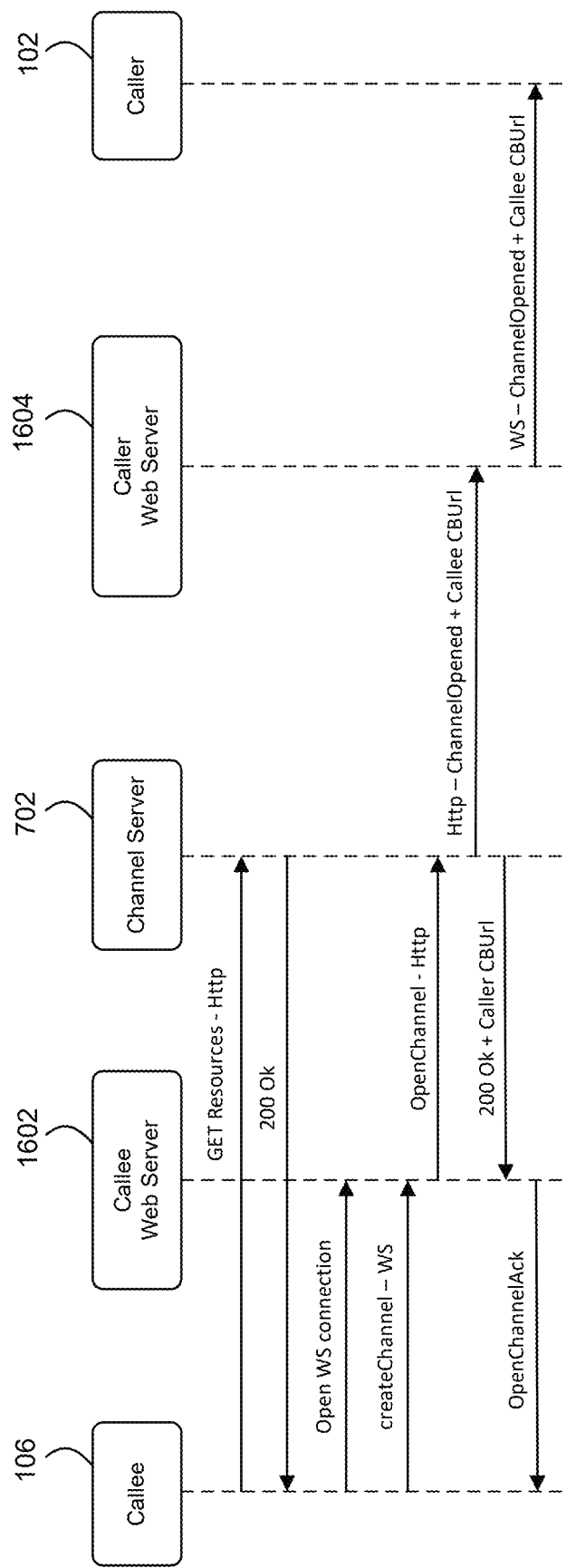
FIG. 16 is a flow diagram depicting example processing for opening a channel by the callee device.

FIG. 16 illustrates an example process for opening a channel that has been created as described above in connection with FIG. 14. As shown in FIG. 16, callee device 106 generates and transmits a "Get resources" message to the channel server 702. The "Get resources" message is used to check the entitlement of the callee device 106. Channel server 702 responds with a short lived token.

The callee device 106 generates and transmits an open web server connection message containing the token to the callee web server 1602. The callee device 106 also generates and transmits an open channel message which is transmitted through callee web server 1602 to channel server 702. In an example embodiment, the open channel message contains the callee URL. The channel server 702 sends a message (such as an open channel acknowledgment message) with the caller URL to the callee device 106 and a message (such as a channel opened message) with the callee URL to the caller 102. It will be appreciated that when a communication is initiated, the caller device 102 need only know the identity of callee device 106—and not the callee URL. The callee URL can be determined once the callee device 106 joins channel.

FIG. 17 illustrates example message formats for the message processing described in connection with FIG. 16. More particularly, FIG. 17 lists example message formats for an open channel request, a successful open channel response, and an open channel notification for the channel creator.

Figure 18:
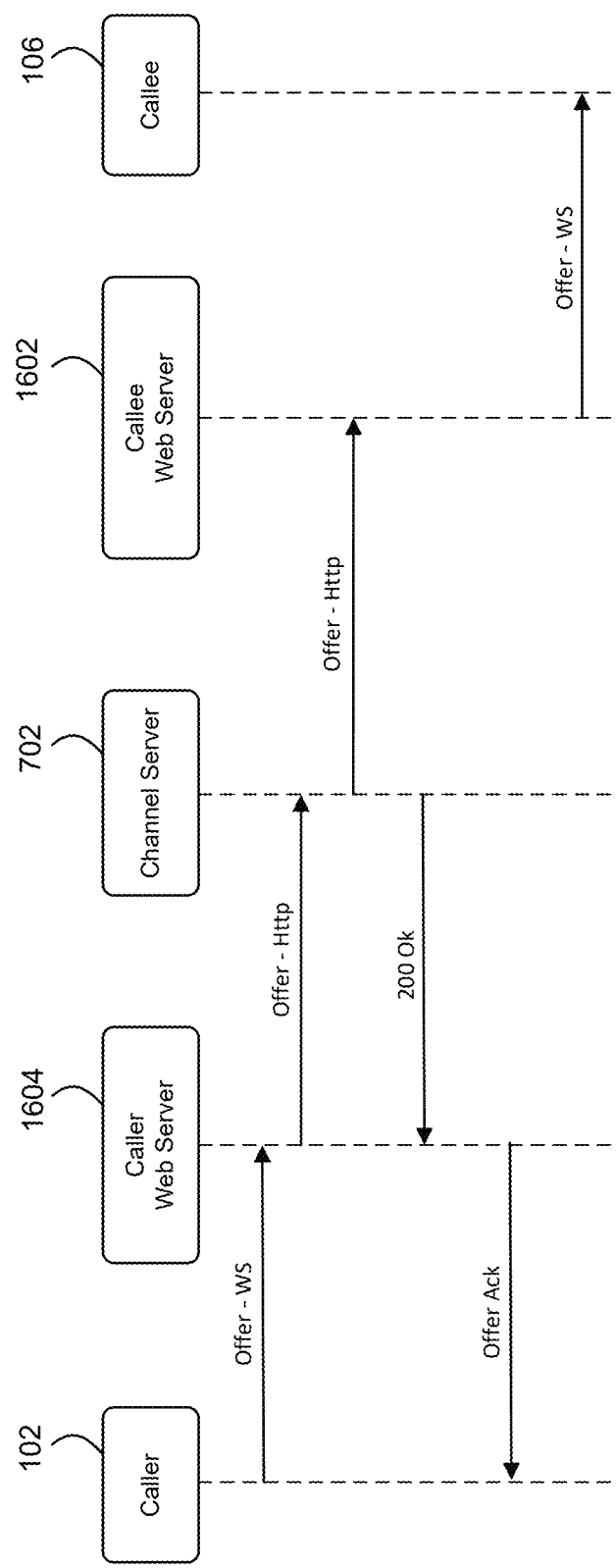
FIG. 18 is a flow diagram depicting example processing in an example embodiment.

FIG. 18 illustrates an example process for communicating offers to perform real time communications between caller and callee devices. As shown, an offer is communicated from the caller device 102 to the caller web server 1604, which communicates the offer to the channel server 702. The channel server 702 communicates an offer to the callee web server 1602, which routes the offer to the callee device 106. The channel server 702 communicates a short lived token to the caller web server 1604, which sends an offer acknowledgment to the caller device 102.

FIG. 19 illustrates example message formats for the message processing described in connection with FIG. 18. More particularly, FIG. 19 lists example message formats for an offer to perform real time communications and for a successful offer response.

FIG. 20 illustrates an example process for communicating an answer to an offer to perform real time communications between callee and caller devices. As shown, an answer (to an offer) is generated and communicated by callee device 106 to callee web server 1602, which communicates an answer message to channel server 702. Channel server 702 communicates an answer message to caller web server 1604, which communicates an answer message to caller device 102. The channel server 702 communicates a short lived token to the callee web server 1602, which sends an answer acknowledgment to the callee device 106.

FIG. 21 illustrates example message formats for the message processing described in connection with FIG. 20. More particularly, FIG. 21 lists example message formats for an answer to a request to perform real time communication.

Figure 22:
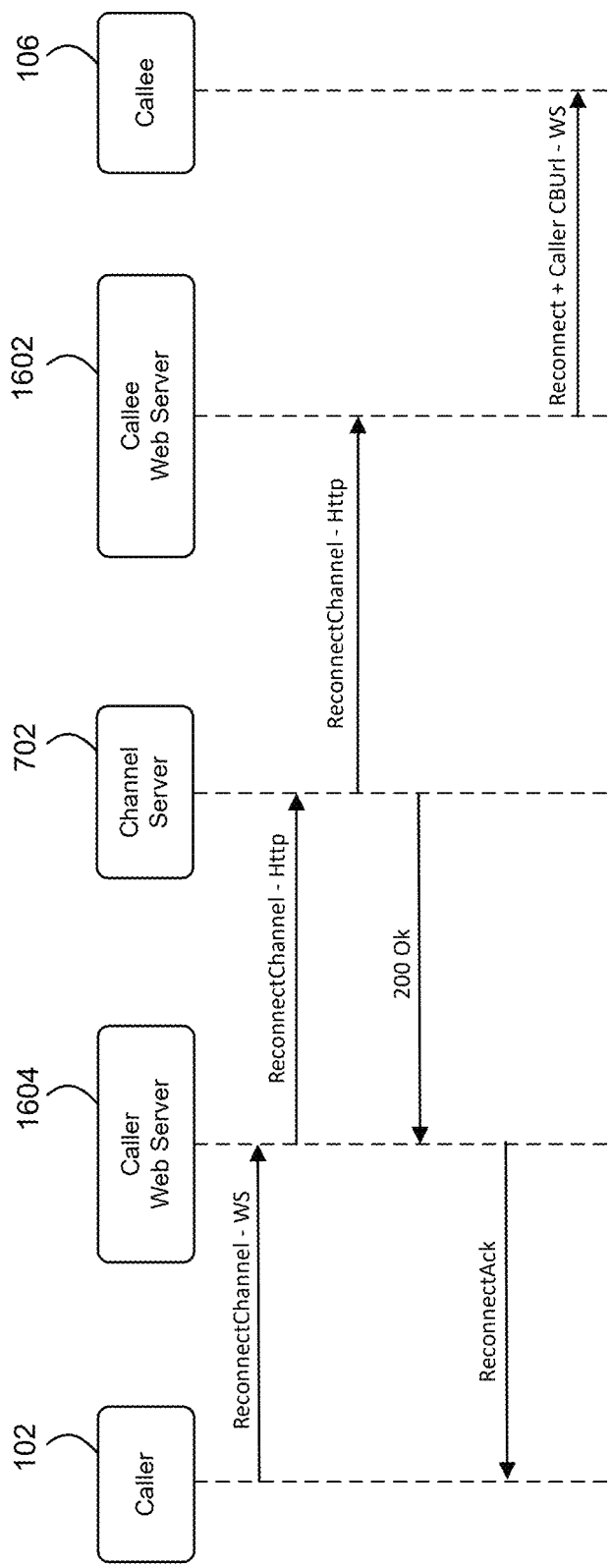
FIG. 22 is a flow diagram depicting example processing for reconnecting channel signaling.

FIG. 22 illustrates an example process for reconnecting channel signaling where one of the parties has a changed URL. As shown in FIG. 22, one of the parties, which in the example scenario depicted in FIG. 22 is caller device 102, sends a reconnect channel message containing its new URL to the caller web server 1604. The caller web server 1604 transmits the request to the channel server 702. Channel server 702 communicates the reconnect channel message to the callee web server 1602 and initiates an acknowledgement of the request back to the caller device 102. The callee web server 1602 communicates a reconnect message with the new URL to the callee device 106. Once the callee device 106 has the new URL for the caller device 102, communications over the channel can continue.

FIG. 23 illustrates example message formats for the message processing described in connection with FIG. 22. More particularly, FIG. 23 lists example message formats for a message to reconnect a channel and a message providing notification of a reconnection.

FIG. 24 illustrates an example process for closing an existing communication channel. As shown in FIG. 24, in an example scenario, the caller device 102 generates and sends a close channel message to the caller web server 1604 which transmits a close channel request to the channel server 702. The channel server generates and transmits a close channel message to the callee web server 1602 and initiates an acknowledgment of the close channel back to the caller device 102. The callee web server 1602 communicates a close channel message to the callee device 106.

FIG. 25 illustrates example message formats for the message processing described in connection with FIG. 24. More particularly, FIG. 25 lists example message formats for a message to close a channel and message confirmation.

Figure 26:
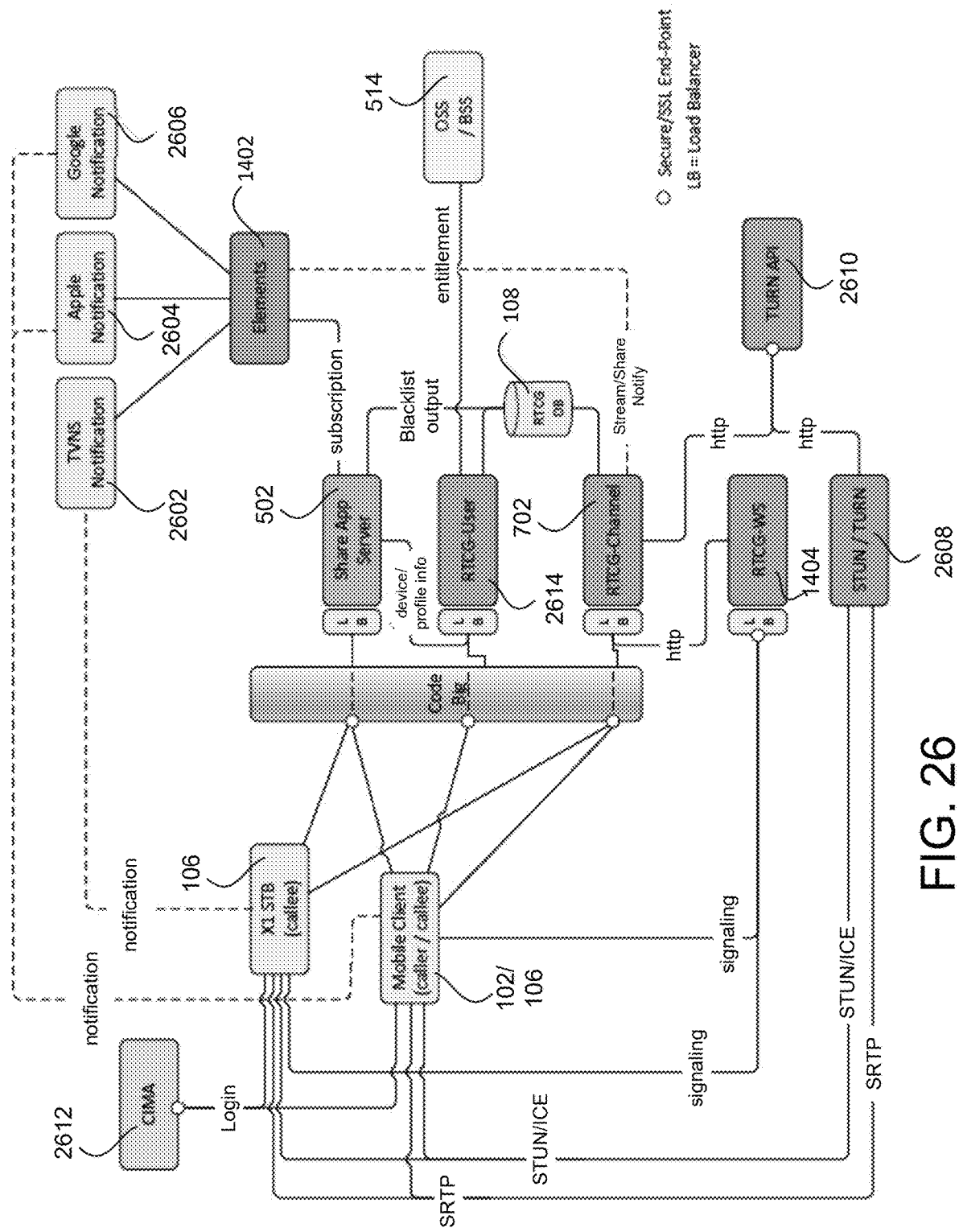
FIG. 26 illustrates functional elements of an example embodiment.

FIG. 26 illustrates functional elements of an example system adapted to provide channel processing as described above. The channel server 702, database 108, caller device 102, and callee device 106 are shown in the context of an exemplary embodiment.

Log in module 2612 allows a user at a client 102 or 106 to log into the system.

App Server 502 runs the business logic for the relevant application. User Server 2614 provides device and profile information to the app server 502. User Server 2614 interacts with Operations Support System (OSS)/Business Support Systems (BSS) 514 which provides access to existing and legacy operations and the billing services.

Notification Server 1402 accepts subscriptions and looks up what type of notification to send. As a consequence of the functionality provided by notification server 1402, the channel server 702 and app server 512 do not need to store the type of callee device. For example, the notification server can send different types of messages such as STB notifications through set top box notification service 2602, IPhone messages through Apple notification service 2604, and messages through Google notification service 2606. Network address translation (NAT) and firewall traversal can be done using block 2608 using Session Traversal Utilities for NAT (STUN) and/or Traversal Using Relays around NAT (TURN). A TURN API 2610 provides access to the STUN and TURN functionality. Traversal Using Relays around NAT (TURN) is a protocol that assists in traversal of network address translators (NAT) or firewalls for multimedia applications. It may be used with the Transmission Control Protocol (TCP) and User Datagram Protocol (UDP). It is most useful for clients on networks masqueraded by symmetric NAT devices.

STUN (Session Traversal Utilities for NAT) is a standardized set of methods and a network protocol to allow an end host to discover its public IP address if it is located behind a NAT. It is used to permit NAT traversal for applications of real-time voice, video, messaging, and other interactive IP communications.

The caller device 102, callee device 106, mediator system 104, channel server 702, as well as any other elements (such as the elements shown in FIG. 26) to implement the systems and methods described herein may incorporate one or more processors adapted to execute instructions of computer programs to perform any of the features described herein. The instructions may be stored in any type of computer-readable medium or memory, to configure the operation of the processor. For example, instructions may be stored in a read-only memory (ROM), random access memory (RAM), hard drive, removable media, such as a Universal Serial Bus (USB) drive, compact disk (CD) or digital versatile disk (DVD), floppy disk drive, or any other desired electronic storage medium. Instructions may also be stored in an attached (or internal) hard drive.

The caller device 102, callee device 106, mediator system 104, channel server 702, as well as any other elements may have any suitable design or configuration. For example, each of the systems may be a uniprocessor system including one processor or a multiprocessor system including several processors (e.g., two, four, eight, or another suitable number). The processors may be any suitable processors capable of executing instructions. For example, in various aspects, the processor(s) may be general-purpose or embedded processors implementing any of a variety of instruction set architectures (ISAs), such as the x86, PowerPC, SPARC, or MIPS ISAs, or any other suitable ISA. In multiprocessor systems, each of the processors may commonly, but not necessarily, implement the same ISA. The systems may include one or more output devices, such as a display (not shown) and may include one or more output device controllers, such as a video processor. The systems may incorporate one or more user input devices, such as a remote control, keyboard, mouse, touch screen, microphone, etc.

Accordingly, has disclosed herein systems and methods that address limitations in real time protocols such as WebRTC by establishing a communication channel between devices prior to offer and acceptance of real time communications. The creation of a channel allows both devices, and particularly the receiving device, to enter a "ready state." The creation of a channel serves as notification to the receiving device that an offer to connect is coming and allows the device and its operator to be prepared to accept.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that may be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that may be performed it is understood that each of these additional steps may be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, may be implemented by special purpose hardware-based computer systems that perform the specified functions or steps, or combinations of special purpose hardware and computer instructions.

It will be apparent to those skilled in the art that various modifications and variations may be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

The invention claimed is:

1. A method comprising:
establishing, based on a request from a caller device, a communication channel with a callee device, wherein the communication channel is associated with at least a caller device address and a first callee device address;
receiving, from the callee device, a first message indicating a second callee device address;
sending, to the caller device based on the first message and in order to maintain the communication channel, a notification, comprising the first callee device address and the second callee device address, indicating that the callee device is associated with the second callee device address;
receiving, from the caller device, a second message comprising the second callee device address; and
based on the second message comprising the second callee device address, forwarding, via the communication channel and to the callee device, the second message.

2. The method of claim 1, wherein the caller device address and the first callee device address is stored by at least one computing device.

3. The method of claim 2, wherein the stored information is updated, based on the first message, by the at least one computing device.

4. The method of claim 1, wherein the first callee device address comprises a first Universal Resource Locator (URL) associated with the callee device, and wherein the second callee device address comprises a second URL associated with the callee device.

5. The method of claim 1, wherein the first message and the second message between the caller device and callee device are communicated via a different computing device of a plurality of computing devices and without accessing a shared persistent database.

6. The method of claim 1, wherein the notification prevents the second message from comprising the first callee device address and being erroneously forwarded to the first callee device address.

7. A device comprising:
one or more processors; and
memory storing instructions that, when executed by the one or more processors, cause the device to:
establish based on a request from a caller device, a communication channel with a callee device, wherein the communication channel is associated with at least a caller device address and a first callee device address;
receive, from a callee device, a first message indicating a second callee device address;

send, to the caller device based on the first message and in order to maintain the communication channel, a notification, comprising the first callee device address and the second callee device address, indicating that the callee device is associated with the second callee device address;

receive, from the callee device, a message comprising the second callee device address; and based on the second message comprising the second callee device address, forward, via the communication channel and to the callee device, the second message.

8. The device of claim 7, wherein the caller device address and the first callee device address is stored by at least one computing device.

9. The device of claim 8, wherein the stored information is updated, based on the first message, by the at least one computing device.

10. The device of claim 7, wherein the first callee device address comprises a first Universal Resource Locator (URL) associated with the callee device, and wherein the second callee device address comprises a second URL associated with the callee device.

11. The device of claim 7, wherein the first message and second message between the caller device and callee device are communicated via a different computing device of the plurality of computing devices and without accessing a shared persistent database.

12. The device of claim 7, wherein the notification prevents the second message from comprising the first callee device address and being erroneously forwarded to the first callee device address.

13. A non-transitory computer-readable storage medium storing computer-readable instructions that, when executed by one or more processors, cause:

establishing, based on a request from a caller device, a communication channel with a callee device, wherein the communication channel is associated with at least a caller device address and a first callee device address;

receiving, from the callee device, a first message indicating a second callee device address;

sending, to the caller device based on the first message and in order to maintain the communication channel, a notification, comprising the first callee device address and the second callee device address, indicating that the callee device is associated with the second callee device address;

receiving, from the caller device, a second message comprising the second callee device address; and based on the second message comprising the second callee device address, forwarding, via the communication channel and to the callee device, the second message.

14. The non-transitory computer-readable storage medium of claim 13, wherein caller device address and the first callee device address is stored by at least one computing device, and wherein the stored information is updated, based on the first message, by the at least one computing device.

15. The non-transitory computer-readable storage medium of claim 13, wherein the first callee device address comprises a first Universal Resource Locator (URL) associated with the callee device, and wherein the second callee device address comprises a second URL associated with the callee device.

16. The non-transitory computer-readable storage medium of claim 13, wherein the first message and second message between the caller device and callee device are communicated via a different computing device of a plurality of computing devices and without accessing a shared persistent database.

17. The non-transitory computer-readable storage medium of claim 13, wherein the notification prevents the second message from comprising the first callee device address and being erroneously forwarded to the first callee device address.

* * * * *